(12) United States Patent
Horstmeyer et al.

(10) Patent No.: US 10,162,161 B2
(45) Date of Patent: Dec. 25, 2018

(54) PTYCHOGRAPHY IMAGING SYSTEMS AND METHODS WITH CONVEX RELAXATION

(71) Applicant: California Institute of Technology, Pasadena, CA (US)

(72) Inventors: Roarke W. Horstmeyer, San Marino, CA (US); Yuhua Chen, Pasadena, CA (US); Joel A. Tropp, Los Angeles, CA (US); Changhuei Yang, Alhambra, CA (US)

(73) Assignee: California Institute of Technology, Pasadena, CA (US)

( * ) Notice: Subject to any disclaimer, the term of this patent is extended or adjusted under 35 U.S.C. 154(b) by 197 days.

(21) Appl. No.: 14/710,947

(22) Filed: May 13, 2015

(65) Prior Publication Data

US 2015/0331228 A1 Nov. 19, 2015

Related U.S. Application Data

(60) Provisional application No. 61/992,505, filed on May 13, 2014.

(51) Int. Cl.
*G02B 21/06* (2006.01)
*G02B 21/36* (2006.01)

(52) U.S. Cl.
CPC .......... *G02B 21/06* (2013.01); *G02B 21/361* (2013.01); *G02B 21/367* (2013.01)

(58) Field of Classification Search
CPC ..... G02B 21/06; G02B 21/361; G02B 21/367

(Continued)

(56) References Cited

U.S. PATENT DOCUMENTS

| 5,475,527 A | 12/1995 | Hackel et al. |
| 6,144,365 A | 11/2000 | Young et al. |

(Continued)

FOREIGN PATENT DOCUMENTS

| CN | 101408623 A | 4/2009 |
| CN | 101868740 A | 10/2010 |

(Continued)

OTHER PUBLICATIONS

A. Chai et al., Array imaging using intensity-only measurements, 2011, IOP Publishing, pp. 1-16.*

(Continued)

*Primary Examiner* — Behrooz M Senfi
*Assistant Examiner* — Kathleen M Walsh
(74) *Attorney, Agent, or Firm* — Sheila Martinez-Lemke; Weaver Austin Villeneuve & Sampson LLP

(57) ABSTRACT

Certain aspects pertain to ptychographic imaging systems and methods with convex relaxation. In some aspects, a ptychographic imaging system with convex relaxation comprises one or more electromagnetic radiation sources, a digital radiation intensity detector, and a processor in communication with the digital radiation detector. The electromagnetic radiation provides coherent radiation to a specimen while the digital radiation intensity detector receives light transferred from the sample by diffractive optics and captures intensity distributions for a sequence of low resolution images having diversity. The processor generates a convex problem based on the sequence of low resolution images and optimizes the convex problem to reconstruct a high-resolution image of the specimen. In certain aspects, the convex problem is relaxed into a low-rank formulation.

18 Claims, 21 Drawing Sheets

(58) Field of Classification Search
USPC .......................................................... 348/79
See application file for complete search history.

(56) References Cited

U.S. PATENT DOCUMENTS

| | | | |
|---|---|---|---|
| 6,154,196 A | 11/2000 | Fleck et al. | |
| 6,320,648 B1 | 11/2001 | Brueck et al. | |
| 6,747,781 B2 | 6/2004 | Trisnadi | |
| 6,905,838 B1 | 6/2005 | Bittner | |
| 7,436,503 B1 | 10/2008 | Chen et al. | |
| 7,460,248 B2 | 12/2008 | Kurtz et al. | |
| 7,706,419 B2 | 4/2010 | Wang et al. | |
| 7,787,588 B1 | 8/2010 | Yun et al. | |
| 8,271,251 B2 | 9/2012 | Schwartz et al. | |
| 8,313,031 B2 | 11/2012 | Vinogradov | |
| 8,497,934 B2 | 7/2013 | Milnes et al. | |
| 8,624,968 B1 | 1/2014 | Hersee et al. | |
| 8,942,449 B2* | 1/2015 | Maiden | G01N 23/205 382/103 |
| 9,029,745 B2 | 5/2015 | Maiden | |
| 9,426,455 B2 | 8/2016 | Horstmeyer et al. | |
| 9,497,379 B2 | 11/2016 | Ou et al. | |
| 9,829,695 B2 | 11/2017 | Kim et al. | |
| 9,864,184 B2 | 1/2018 | Ou et al. | |
| 9,892,812 B2 | 2/2018 | Zheng et al. | |
| 9,983,397 B2 | 5/2018 | Horstmeyer et al. | |
| 9,993,149 B2 | 6/2018 | Chung et al. | |
| 9,998,658 B2 | 6/2018 | Ou et al. | |
| 2001/0055062 A1 | 12/2001 | Shioda et al. | |
| 2002/0141051 A1 | 10/2002 | Vogt et al. | |
| 2003/0116436 A1 | 6/2003 | Amirkhanian et al. | |
| 2004/0146196 A1 | 7/2004 | Van Heel | |
| 2004/0190762 A1 | 9/2004 | Dowski, Jr. et al. | |
| 2005/0211912 A1 | 9/2005 | Fox | |
| 2006/0098293 A1 | 5/2006 | Garoutte et al. | |
| 2006/0158754 A1 | 7/2006 | Tsukagoshi et al. | |
| 2006/0173313 A1 | 8/2006 | Liu et al. | |
| 2006/0291707 A1 | 12/2006 | Kothapalli et al. | |
| 2007/0057184 A1* | 3/2007 | Uto | G01N 21/95607 250/310 |
| 2007/0133113 A1 | 6/2007 | Minabe et al. | |
| 2007/0159639 A1* | 7/2007 | Teramura | G01B 9/02044 356/485 |
| 2007/0171430 A1 | 7/2007 | Tearney et al. | |
| 2007/0189436 A1 | 8/2007 | Goto et al. | |
| 2008/0101664 A1 | 5/2008 | Perez | |
| 2009/0046164 A1 | 2/2009 | Shroff et al. | |
| 2009/0079987 A1 | 3/2009 | Ben-Ezra et al. | |
| 2009/0125242 A1 | 5/2009 | Choi et al. | |
| 2009/0284831 A1 | 11/2009 | Schuster et al. | |
| 2009/0316141 A1 | 12/2009 | Feldkhun | |
| 2010/0135547 A1 | 6/2010 | Lee et al. | |
| 2010/0271705 A1 | 10/2010 | Hung | |
| 2011/0075928 A1 | 3/2011 | Jeong et al. | |
| 2011/0192976 A1 | 8/2011 | Own et al. | |
| 2011/0235863 A1 | 9/2011 | Maiden | |
| 2012/0069344 A1 | 3/2012 | Liu | |
| 2012/0099803 A1 | 4/2012 | Ozcan et al. | |
| 2012/0105618 A1 | 5/2012 | Brueck et al. | |
| 2012/0118967 A1 | 5/2012 | Gerst | |
| 2012/0157160 A1 | 6/2012 | Ozcan et al. | |
| 2012/0218379 A1 | 8/2012 | Ozcan et al. | |
| 2012/0248292 A1* | 10/2012 | Ozcan | G02B 21/00 250/208.1 |
| 2012/0250032 A1* | 10/2012 | Wilde | G01B 9/02047 356/521 |
| 2012/0281929 A1* | 11/2012 | Brand | G06T 3/4053 382/255 |
| 2013/0083886 A1 | 4/2013 | Carmi et al. | |
| 2013/0093871 A1* | 4/2013 | Nowatzyk | G02B 21/14 348/79 |
| 2013/0094077 A1* | 4/2013 | Brueck | G02B 21/06 359/385 |
| 2013/0100525 A1 | 4/2013 | Chiang et al. | |
| 2013/0170767 A1* | 7/2013 | Choudhury | G06T 3/4053 382/260 |
| 2013/0182096 A1* | 7/2013 | Boccara | A61B 5/0066 348/79 |
| 2013/0223685 A1 | 8/2013 | Maiden | |
| 2014/0007307 A1 | 1/2014 | Routh, Jr. et al. | |
| 2014/0029824 A1* | 1/2014 | Shi | G06T 11/005 382/131 |
| 2014/0043616 A1* | 2/2014 | Maiden | G06T 1/0007 356/446 |
| 2014/0050382 A1 | 2/2014 | Adie et al. | |
| 2014/0118529 A1 | 5/2014 | Zheng et al. | |
| 2014/0126691 A1 | 5/2014 | Zheng et al. | |
| 2014/0152801 A1 | 6/2014 | Fine et al. | |
| 2014/0153692 A1 | 6/2014 | Larkin et al. | |
| 2014/0160236 A1 | 6/2014 | Ozcan et al. | |
| 2014/0160488 A1 | 6/2014 | Zhou | |
| 2014/0267674 A1 | 9/2014 | Mertz et al. | |
| 2014/0347672 A1* | 11/2014 | Pavillon | A61B 5/0066 356/491 |
| 2014/0368812 A1* | 12/2014 | Humphry | G01B 11/24 356/124 |
| 2015/0036038 A1 | 2/2015 | Horstmeyer et al. | |
| 2015/0054979 A1 | 2/2015 | Ou et al. | |
| 2015/0160450 A1 | 6/2015 | Ou et al. | |
| 2015/0264250 A1 | 9/2015 | Ou et al. | |
| 2016/0088205 A1 | 3/2016 | Horstmeyer et al. | |
| 2016/0178883 A1 | 6/2016 | Horstmeyer et al. | |
| 2016/0202460 A1 | 7/2016 | Zheng | |
| 2016/0210763 A1 | 7/2016 | Horstmeyer et al. | |
| 2016/0216208 A1 | 7/2016 | Kim et al. | |
| 2016/0216503 A1 | 7/2016 | Kim et al. | |
| 2016/0266366 A1 | 9/2016 | Chung et al. | |
| 2016/0320595 A1 | 11/2016 | Horstmeyer et al. | |
| 2016/0320605 A1 | 11/2016 | Ou et al. | |
| 2016/0341945 A1 | 11/2016 | Ou et al. | |
| 2017/0178317 A1 | 6/2017 | Besley et al. | |
| 2017/0273551 A1 | 9/2017 | Chung et al. | |
| 2017/0299854 A1 | 10/2017 | Kim et al. | |
| 2017/0354329 A1 | 12/2017 | Chung et al. | |
| 2017/0363853 A1 | 12/2017 | Besley | |
| 2017/0371141 A1 | 12/2017 | Besley | |
| 2018/0088309 A1 | 3/2018 | Ou et al. | |

FOREIGN PATENT DOCUMENTS

| | | |
|---|---|---|
| CN | 101872033 A | 10/2010 |
| CN | 102608597 A | 7/2012 |
| CN | 103201648 A | 7/2013 |
| JP | 2007-299604 | 11/2007 |
| JP | 2010-012222 A | 1/2010 |
| KR | 10-1998-0075050 | 11/1998 |
| WO | WO9953469 | 10/1999 |
| WO | WO 2002/102128 A1 | 12/2002 |
| WO | WO 2003/062744 A1 | 7/2003 |
| WO | WO 2008-116070 | 9/2008 |
| WO | WO 2011-093043 | 8/2011 |
| WO | WO 2012/037182 A1 | 3/2012 |
| WO | WO 2014/070656 A1 | 5/2014 |
| WO | WO 2015/017730 A1 | 2/2015 |
| WO | WO 2015/027188 A1 | 2/2015 |
| WO | WO 2016/090331 A1 | 6/2016 |
| WO | WO 2016/106379 A1 | 6/2016 |
| WO | WO 2016/118761 A1 | 7/2016 |
| WO | WO 2016/123156 A1 | 8/2016 |
| WO | WO 2016/123157 A1 | 8/2016 |
| WO | WO 2016/149120 A1 | 9/2016 |
| WO | WO 2016/187591 A1 | 11/2016 |
| WO | WO 2017081539 A1 | 5/2017 |
| WO | WO 2017081540 A1 | 5/2017 |
| WO | WO 2017081542 A2 | 5/2017 |

OTHER PUBLICATIONS

A. Maiden et al., Superresolution imaging via ptychography, 2011, J.Opt. Soc. Am., vol. 28, No. 4, pp. 604-612.*

(56) References Cited

OTHER PUBLICATIONS

U.S. Appl. No. 14/960,252 filed Dec. 4, 2015 entitled "Multiplexed Fourier Ptychography Imaging Systems and Methods".
U.S. Appl. No. 14/979,154 filed Dec. 22, 2015 entitled "EPI-Illumination Fourier Ptychographic Imaging for Thick Samples".
Office Action dated Oct. 5, 2015 in U.S. Appl. No. 14/065,305.
Notice of Allowance dated Dec. 4, 2015 in U.S. Appl. No. 14/065,305.
International Search Report and Written Opinion dated Feb. 21, 2014 in PCT/US2013/067068.
International Preliminary Report on Patentability dated May 14, 2015 in PCT/US2013/067068.
International Search Report and Written Opinion dated Dec. 5, 2014 in PCT/US2014/052351.
International Search Report and Written Opinion dated Nov. 13, 2014 in PCT/US2014/049297.
"About Molemap," [Downloaded from internet at http://molemap.net.au/about-us/], 2 pages.
"Doctor Mole—Skin Cancer App," [Downloaded from internet at http://www.doctormole.com], 1 page.
"Immersion Media," Olympus, Microscopy Resource Center, http://www.olympusmicro.com/primer/anatomy/immersion.html.
"Lytro," [Downloaded from internet at https://www.lytro.com/], 6 pages.
"Melafind," [Downloaded from internet at http://www.melafind.com/], 4 pages.
"TFOCS: Templates for First-Order Conic Solvers," CVX Research, CVX Forum, http://cvxr.com/tfocs/.
Maiden, A. et al., "A new method of high resolution, quantitative phase scanning microscopy," in: M.T. Postek, D.E. Newbury, S.F. Platek, D.C. Joy (Eds.), SPIE Proceedings of Scanning Microscopy, 7729, 2010.
Alexandrov, S. A. et al., "Synthetic Aperture Fourier holographic optical microscopy," Phys. Rev. Left. 97, 168102 (2006).
Alexandrov, S. et al., "Spatial information transmission beyond a system's diffraction limit using optical spectral encoding of the spatial frequency," Journal of Optics A: Pure and Applied Optics 10, 025304 (2008).
Arimoto, H. et al. "Integral three-dimensional imaging with digital reconstruction," Opt. Lett. 26, 157-159 (2001).
Balan, R. et al., "Painless reconstruction from magnitudes of frame coefficients," J Fourier Anal Appl 15:488-501 (2009).
Bauschke, HH et al., "Phase retrieval, error reduction algorithm, and Fienup variants: a view from convex optimization," J Opt Soc Am A 19:1334-1345 (2002).
Becker, S. et al., "Templates for convex cone problems with applications to sparse signal recovery," Technical report, Department of Statistics, Stanford University, (2010), 48 Pages.
Betti, R., et al., "Observational study on the mitotic rate and other prognostic factors in cutaneous primary melanoma arising from naevi and from melanoma de novo," Journal of the European Academy of Dermatology and Venereology, 2014.
Bian, L. et al., "Fourier ptychographic reconstruction using Wirtinger flow optimization," Opt. Express 23:4856-4866 (2015).
Bian, Z. et al., "Adaptive system correction for robust Fourier ptychographic imaging," Optics express, 2013. 21(26): p. 32400-32410.
Blum, A. et al, "Clear differences in hand-held dermoscopes," JDDG: Journal der Deutschen Dermatologischen Gesellschaft, 2006, 4(12): p. 1054-1057.
Blum, A., et al., Dermatoskopie von Hauttumoren: Auflichtmikroskopie; Dermoskopie; digitale Bildanalyse; mit 28 Tabellen. 2003: Springer DE, Chapter 4 "Dermatoskopisch sichtbare Strukturen" p. 15-66.
Brady, D. et al., "Multiscale gigapixel photography," Nature 486, 386-389 (2012).
Burer S, Monteiro RDC (2003) A nonlinear programming algorithm for solving semidefinite programs via low-rank factorization. Math Program, Ser B 95:329-357.
Burer, S. et al., "Local minima and convergence in low-rank semidefmite programming. Math Program," Ser A 103:427-444 (2005).
Candes, EJ. Et al., "Phase retrieval via matrix completion," SIAM J. Imaging Sci. 6:199-225 (2012).
Candes, EJ. Et al., "PhaseLift: exact and stable signal recovery from magnitude measurements via convex programming.," Comm Pure Appl Math 66:1241-1274 (2013).
Candes, EJ. et al., "Soltanolkotabi M Phase retrieval via Wirtinger flow: theory and algorithms," IEEE Trans. Info. Theory 61:1985-2007 (2015).
Chen, T. et al., "Polarization and phase shifting for 3D scanning of translucent objects," Proc. CVPR, (2007).
Chin, L. et al., "Malignant melanoma: genetics and therapeutics in the genomic era," Genes & development, 2006, 20(16): p. 2149-2182.
Colomb, T. et al., "Automatic procedure for aberration compensation in digital holographic microscopy and applications to specimen shape compensation," Appl. Opt. 45, 851-863 (2006).
De Sa, C. et al., "Global convergence of stochastic gradient descent for some non convex matrix problems," Proc. 32nd Int. Conf. Machine Learning (2015).
Denis, L. et al., "Inline hologram reconstruction with sparsity constraints," Opt. Left. 34, pp. 3475-3477 (2009).
Di, J. et al., "High resolution digital holographic microscopy with a wide field of view based on a synthetic aperture technique and use of linear CCD scanning," Appl. Opt. 47, pp. 5654-5659 (2008).
Dierolf, M. et al., "Ptychographic coherent diffractive imaging of weakly scattering specimens," New J. Phys. 12, 035017 (2010).
Dong, S. et al., "Aperture-scanning Fourier ptychography for 3D refocusing and super-resolution macroscopic imaging," pp. 13586-13599 (Jun. 2, 2014).
Eldar, Y.C. et al., "Sparse phase retrieval from short-time Fourier measurements," IEEE Signal Processing Letters 22, No. 5 (2015): 638-642.
Emile, O. et al., "Rotating polarization imaging in turbid media," Optics Letters 21(20), (1996).
Faulkner, H. et al., "Movable aperture lensless transmission microscopy: a novel phase retrieval algorithm," Phys. Rev. Left. 93, 023903 (2004).
Faulkner, H. M. L. et al., "Error tolerance of an iterative phase retrieval algorithm for moveable illumination microscopy," Ultramicroscopy 103(2), 153-164 (2005).
Fazel, M. (2002) Matrix rank minimization with applications. PhD thesis (Stanford University, Palo Alto, CA).
Feng, P. et al., "Long-working-distance synthetic aperture Fresnel off-axis digital holography," Optics Express 17, pp. 5473-5480 (2009).
Fienup, J. R., "Invariant error metrics for image reconstruction," Appl. Opt. 36(32), 8352-8357 (1997).
Fienup, J. R., "Lensless coherent imaging by phase retrieval with an illumination pattern constraint," Opt. Express 14, 498-508 (2006).
Fienup, J. R., "Phase retrieval algorithms: a comparison," Appl. Opt. 21, 2758-2769 (1982).
Fienup, J. R., "Reconstruction of a complex-valued object from the modulus of its Fourier transform using a support constraint," J. Opt. Soc. Am. A 4, 118-123 (1987).
Fienup, J. R., "Reconstruction of an object from the modulus of its Fourier transform," Opt. Lett. 3, 27-29 (1978).
Gan, X. et al., "Image enhancement through turbid media under a microscope by use of polarization gating methods," JOSA A 16(9), (1999).
Ghosh, A. et al., "Multiview face capture using polarized spherical gradient illumination," ACM Transactions on Graphics 30(6) (2011).
Goodman J. "Introduction to Fourier Optics," Roberts & Company Publication, Third • Edition, chapters 1-6, pp. 1-172 (2005).
Goodson, A.G., et al., "Comparative analysis of total body and dermatoscopic photographic monitoring of nevi in similar patient populations at risk for cutaneous melanoma," Dermatologic Surgery, 2010. 36(7): p. 1087-1098.
Granero, L. et al., "Synthetic aperture superresolved microscopy in digital lensless Fourier holography by time and angular multiplexing of the object information," Appl. Opt. 49, pp. 845-857 (2010).
Grant, M. et al., "CVX: Matlab software for disciplined convex programming," version 2.0 beta. http://cvxr.com/cvx, (Sep. 2013), 3 pages.

(56) References Cited

OTHER PUBLICATIONS

Greenbaum, A. et al., "Increased space—bandwidth product in pixel super-resolved lensfree on-chip microscopy," Sci. Rep. 3, p. 1717 (2013).
Guizar-Sicairos M. "Phase retrieval with transverse translation diversity: a nonlinear optimization approach," Opt. Express 16, 7264-7278 (2008).
Gunturk, B. K. et al., "Image Restoration: Fundamentals and Advances," vol. 7, Chapter 3, pp. 63-68 (CRC Press, 2012).
Gustafsson, M. G., "Surpassing the lateral resolution limit by a factor of two using structured illumination microscopy," J. Microsc. 198, 82-87 (2000).
Gutzler, T. et al., "Coherent aperture-synthesis, wide-field, high-resolution holographic microscopy of biological tissue," Opt. Lett. 35, pp. 1136-1138 (2010).
Hillman, T. R. et al., "High-resolution, wide-field object reconstruction with synthetic aperture Fourier holographic optical microscopy," Opt. Express 17, pp. 7873-7892 (2009).
Hong, S-H. et al., "Three-dimensional volumetric object reconstruction using computational integral imaging," Opt. Express 12, 483-491 (2004).
Hoppe, W., "Diffraction in inhomogeneous primary wave fields. 1. Principle of phase determination from electron diffraction interference," Acta Crystallogr. A25, 495-501 1969.
Horstmeyer, R. et al., "A phase space model of Fourier ptychographic microscopy," Optics Express, 2014. 22(1): p. 338-358.
Horstmeyer, R. et al., "Overlapped fourier coding for optical aberration removal," Manuscript in preparation, 19 pages (2014).
Hüe, F. et al., "Wave-front phase retrieval in transmission electron microscopy via ptychography," Phys. Rev. B 82, 121415 (2010).
Humphry, M. et al., "Ptychographic electron microscopy using high-angle dark-field scattering for sub-nanometre resolution imaging," Nat. Commun. 3, 730 (2012).
Rodenburg, J., "Ptychography and related diffractive imaging methods," Adv. Imaging Electron Phys.150, 87-184 (2008).
Jaganathan, K. et al., "Phase retrieval with masks using convex optimization," IEEE International Symposium on Information Theory Proceedings (2015): 1655-1659.
Jaganathan, K. et al., "Recovery of sparse 1-D signals from the magnitudes of their Fourier transform," IEEE International Symposium on Information Theory Proceedings (2012): 1473-1477.
Jaganathan, K. et al., "STFT Phase retrieval: uniqueness guarantees and recovery algorithms," arXiv preprint arXiv:1508.02820 (2015).
Sun, J. et al., "Coded multi-angular illumination for Fourier ptychography based on Hadamard codes," 5 pages (2015).
Kim, M. et al., "High-speed synthetic aperture microscopy for live cell imaging," Opt. Lett. 36, pp. 148-150 (2011).
Kittler, H., et al., Morphologic changes of pigmented skin lesions: a useful extension of the ABCD rule for dermatoscopy. Journal of the American Academy of Dermatology, 1999. 40(4): p. 558-562.
Levoy, M. et al., "Light field microscopy," ACM Trans. Graphics 25, (2006).
Levoy, M. et al., "Recording and controlling the 4D light field in a microscope using microlens arrays," J. Microsc. 235 (2009).
Li X. et al., "Sparse signal recovery from quadratic measurements via convex programming," SIAM Journal on Mathematical Analysis 45, No. 5 (2013): 3019-3033.
Lohmann, A. W., Dorsch, R. G., Mendlovic, D., Zalevsky, Z. & Ferreira, C., "Space—bandwidth product of optical signals and systems," J. Opt. Soc. Am. A 13, pp. 470-473 (1996).
Lue, N. et al., "Live Cell Refractometry Using Hilbert Phase Microscopy and Confocal Reflectance Microscopy," The Journal of Physical Chemistry A, 113, pp. 13327-13330 (2009).
Maiden et al., "Superresolution imaging via ptychography," Journal of the Optical Society of America A. Apr. 2011, vol. 28 No. 4, pp. 604-612.
Maiden, A. et al., "An improved ptychographical phase retrieval algorithm for diffractive imaging,"Ultramicroscopy 109(10), 1256-1262 (2009).

Maiden, A. M. et al., "Optical ptychography: a practical implementation with useful resolution," Opt. Lett. 35, 2585-2587 (2010).
Marchesini S., "A unified evaluation of iterative projection algorithms for phase retrieval," Rev Sci Instrum 78:011301 (2007).
Marchesini S. et al., "Augmented projections for ptychographic imaging," Inverse Probl 29:115009 (2013).
Marrison, J. et al., "Ptychography—a label free, high-contrast imaging technique for live cells using quantitative phase information," Sci. Rep. 3, 2369 (2013).
Miao et al., "High Resolution 3D X-Ray Diffraction Microscopy," Physical Review Letters, Aug. 19, 2002, vol. 89, No. 8, pp. 1-4.
Mico, V. et al., "Synthetic aperture microscopy using off-axis illumination and polarization coding," Optics Communications, pp. 276, 209-217 (2007).
Mico, V. et al., "Synthetic aperture superresolution with multiple off-axis holograms," JOSA A 23, pp. 3162-3170 (2006).
Mir M. et al., "Blood screening using diffraction phase cytometry," Journal of Biomedical Optics 15, pp. 027016-027014 (2010).
Mir, M. et al., "Optical measurement of cycle-dependent cell growth," Proceedings of the National Academy of Sciences 108, pp. 13124-13129 (2011).
Nayar, S. K. et al., "Fast separation of direct and global components of a scene using high frequency illumination," ACM Transactions on Graphics 25(3) (2006).
Ng, R. et al., "Light field photography with a hand-held plenoptic camera", Computer Science Technical Report CSTR, 2005. 2(11).
Nomura, H. et al., "Techniques for measuring aberrations in lenses used in photolithography with printed patterns," Appl. Opt. 38(13), 2800-2807 (1999).
Ohlsson, H. et al., "Compressive phase retrieval from squared output measurements via semidefinite programming," arXiv:1111.6323 (2011).
Ou, X. et al., "High numerical aperture Fourier ptychography: principle, implementation and characterization," Opt. Express 23:3472-3491 (2015).
Ou, X.. et al., "Quantitative phase imaging via Fourier ptychographic microscopy," Optics Letters, 2013. 38(22): p. 4845-4848.
Ou. et al., "Embedded pupil function recovery for Fourier ptychographic microscopy," Optics Express 22 (5), pp. 4960-4972 (2014).
Balan, R. et al., "On signal reconstruction without phase, Applied and Computational Harmonic Analysis 20," No. 3 (2006): 345-356.
Recht, B. et al., "Guaranteed minimum-rank solutions of linear matrix equations via nuclear norm minimization," SIAM Review 52, No. 3 (2010): 471-501.
Reinhard, E. et al., "High Dynamic Range Imaging: Acquisition, Display, and Image-based Lighting," (Morgan Kaufmann, 2010).
Rodenburg, J. M. et al., "A phase retrieval algorithm for shifting illumination," Appl. Phys. Lett. 85, 4795-4797 (2004).
Rodenburg, J. M. et al., "Hard-X-ray lensless imaging of extended objects," Phys. Rev. Lett. 98, 034801 (2007).
Rodenburg, J. M. et al., "The theory of super-resolution electron microscopy via Wigner-distribution deconvolution," Phil. Trans. R. Soc. Lond. A 339, 521-553 (1992).
Schnars, U. et al., "Digital recording and numerical reconstruction of holograms," Measurement Science and Technology, 13, R85 (2002).
Schwarz, C. J. et al., "Imaging interferometric microscopy," Optics letters 28, pp. 1424-1426 (2003).
Shechner, Y.Y.et al., "Polarization-based vision through haze," Applied Optics 42(3), (2003).
Shechtman, Y. et al., "Sparsity based sub-wavelength imaging with partially incoherent light via quadratic compressed sensing," Opt Express 19:14807-14822 (2011).
Siegel, R. et al. "Cancer statistics 2013," CA: a cancer journal for clinicians, 2013. 63(1): p. 11-30.
Stoecker, W.V., R.K. Rader, and A. Halpern, Diagnostic Inaccuracy of Smartphone Applications for Melanoma Detection: Representative Lesion Sets and the Role for Adjunctive Technologies. JAMA Dermatology, 2013. 149(7): p. 884.
Sun, D. L. et al., "Estimating a signal from a magnitude spectrogram via convex optimization," arXiv:1209.2076 (2012).
Thibault, P. et al., "Probe retrieval in ptychographic coherent diffractive imaging," Ultramicroscopy 109(4), 338-343 (2009).

(56) References Cited

OTHER PUBLICATIONS

Thibault P. et al., "High-resolution scanning X-ray diffraction microscopy," Science 321, 379-382 (2008).
Thomas L. et al.. Semiological value of ABCDE criteria in the diagnosis of cutaneous pigmented tumors. Dermatology, 1998. 197(1): p. 11-17.
Tippie, A.E. et al., "High-resolution synthetic-aperture digital holography with digital phase and pupil correction," Opt. Express 19, pp. 12027-12038 (2011).
Turpin, T. et al., "Theory of the synthetic aperture microscope," pp. 230-240 (1995).
Tyson, R., "Principles of Adaptive Optics" (CRC Press, 2010).
Mahajan V. N. "Zernike circle polynomials and optical aberrations of systems with circular pupils," Appl. Opt. 33(34), 8121-8124 (1994).
Waldspurger, I. et al., "Phase recovery, maxcut and complex semidefinite programming," Mathematical Programming 149, No. 1-2 (2015): 47-81.
Wang. Z. et al., "Tissue refractive index as marker of disease," Journal of Biomedical Optics 16, 116017-116017 (2011).
Watanabe, M. et al., "Telecentric optics for focus analysis," IEEE trans. pattern. anal. mach. intell., 19 1360-1365 (1997).
Wesner J. et al., "Reconstructing the pupil function of microscope objectives from the intensity PSF," in Current Developments in Lens Design and Optical Engineering III, R. E. Fischer, W. J. Smith, and R. B. Johnson, eds., Proc. SPIE 4767, 32-43 (2002).
Wolf, J.A. et al., "Diagnostic Inaccuracy of Smartphone Applications for Melanoma Detection," JAMA Dermatology, 2013, 149(7): p. 885-885.
Wu, J. et al., "Focal plane tuning in wide-field-of-view microscope with Talbot pattern illumination," Opt. Lett. 36, 2179-2181 (2011).
Wu, J. et al., "Wide field-of-view microscope based on holographic focus grid illumination," Opt. Lett. 35, 2188-2190 (2010).
Xu, W. et al., "Digital in-line holography for biological applications," Proc. Natl Acad. Sci. USA 98, pp. 11301-11305 (2001).
Yuan, C. et al., "Angular multiplexing in pulsed digital holography for aperture synthesis," Optics Letters 33, pp. 2356-2358 (2008).
Zhang Y. et al., "Self-learning based fourier ptychographic microscopy," Optics Express, 16pgs (2015).
Zheng, G. et al.. "Characterization of spatially varying aberrations for wide field-of-view microscopy," Opt. Express 21, 15131-15143 (2013).
Zheng, G. et al., "Microscopy refocusing and dark-field imaging by using a simple LED array," Opt. Lett. 36, 3987-3989 (2011).
Zheng, G. et al., "Sub-pixel resolving optofluidic microscope for on-chip cell imaging," Lab Chip 10, pp. 3125-3129 (2010).
Zheng, G. et al., "The ePetri dish, an on-chip cell imaging platform based on subpixel perspective sweeping microscopy (SPSM)," Proc. Natl Acad. Sci. USA 108, pp. 16889-16894 (2011).
Zheng, G. et at, "Wide-field, high-resolution Fourier ptychographic microscopy," Nature Photonics (2013).
Zheng, G.A. et al., "0.5 gigapixel microscopy using a flatbed scanner," Biomed. Opt. Express 5, 1-8 (2014).
Tian, L. et al., "Multiplexed Coded Illumination for Fourier Ptychography with an LED Array Microscope," Optical Society of America, 14 pages (2014).
Schechner, Y., "Multiplexing for Optimal Lighting," IEEE Transactions on Pattern Analysis and Machine Intelligence, vol. 29, No. 8, 1339-1354 (2007).
Ma, W. et al., "Rapid Acquisition of Specular and Diffuse Normal Maps from Polarized Spherical Gradient Illumination," University of Southern California, Institute for Creative Technologies, 12 pages (2007).
Rowe, M.P. et al., "Polarization-difference imaging: a biologically inspired technique for observation through scattering media," Optics Letters, vol. 20, No. 6, 3 pages. (1995).
Gruev, V. et al., "Dual-tier thin film polymer polarization imaging sensor," Optics Express, vol. 18, No. 18, 12 pages. (2010).
Preliminary Amendment dated Mar. 17, 2014 filed in U.S. Appl. No. 14/065,280.

Preliminary Amendment dated Nov. 28, 2016 filed in U.S. Appl. No. 15/206,859.
Preliminary Amendment dated Mar. 17, 2014 filed in U.S. Appl. No. 14/065,305.
Preliminary Amendment dated Nov. 28, 2016 filed in U.S. Appl. No. 15/209,604.
U.S. Notice of Allowance dated Jan. 14, 2016 in U.S. Appl. No. 14/448,850.
U.S. Notice of Allowance dated Jan. 22, 2016 in U.S. Appl. No. 14/466,481.
U.S. Notice of Allowance dated Apr. 13, 2016 in U.S. Appl. No. 14/448,850.
U.S. Notice of Allowance dated Apr. 22, 2016 in U.S. Appl. No. 14/466,481.
U.S. Office Action dated Jul. 14, 2016 in U.S. Appl. No. 15/007,196.
U.S. Notice of Allowance dated Aug. 23, 2016 in U.S. Appl. No. 14/466,481.
U.S. Office Action dated Aug. 16, 2016 in U.S. Appl. No. 14/065,280.
U.S. Office Action dated Sep. 16, 2016 I U.S. Appl. No. 14/065,305.
U.S. Notice of Allowance dated Nov. 2, 2016 in U.S. Appl. No. 14/572,493.
U.S. Office Action dated Nov. 22, 2016 in U.S. Appl. No. 15/003,559.
U.S. Supplemental Notice of Allowance dated Dec. 12, 2016 in U.S. Appl. No. 14/572,493.
U.S. Notice of Allowance dated Jan. 13, 2017 in U.S. Appl. No. 14/065,305.
U.S. Final Office Action dated Jan. 23, 2017 in U.S. Appl. No. 15/007,196.
U.S. Office Action dated Feb. 21, 2017 in U.S. Appl. No. 14/960,252.
U.S. Supplemental Notice of Allowability dated Mar. 2, 2017 in U.S. Appl. No. 14/065,305.
U.S. Notice of Allowance dated Mar. 8, 2017 in U.S. Appl. No. 14/572,493.
U.S. Office Action dated Mar. 13, 2017 in U.S. Appl. No. 14/658,019.
U.S. Notice of Allowance dated Mar. 22, 2017 in U.S. Appl. No. 15/007,196.
U.S. Notice of Allowance dated Mar. 31, 2017 in U.S. Appl. No. 14/572,493.
U.S. Final Office Action dated Apr. 3, 2017 in U.S. Appl. No. 14/065,280.
U.S. Notice of Allowance dated Jun. 9, 2017 in U.S. Appl. No. 14/065,305.
U.S. Notice of Allowance dated Jun. 9, 2017 in U.S. Appl. No. 15/206,859.
U.S. Notice of Allowance dated Jun. 9, 2017 in U.S. Appl. No. 15/007,196.
U.S. Notice of Allowance dated Jun. 20, 2017 in U.S. Appl. No. 14/572,493.
U.S. Supplemental Notice of Allowance dated Jun. 28, 2017 in U.S. Appl. No. 15/206,859.
U.S. Final Office Action dated Jul. 27, 2017 in U.S. Appl. No. 15/003,559.
U.S. Notice of Allowance dated Aug. 16, 2017 in U.S. Appl. No. 15/209,604.
U.S. Notice of Allowance dated Sep. 1, 2017 in U.S. Appl. No. 15/206,859.
European Third-Party Observations, dated Jan. 20, 2016 in EP Application No. 13851670.3.
European Extended Search Report dated Mar. 31, 2016 in EP Application No. 13851670.3.
International Preliminary Report on Patentability dated Mar. 3, 2016 issued in PCT/US2014/052351.
International Preliminary Report on Patentability dated Feb. 11, 2016 issued in PCT/US2014/049297.
International Search Report and Written Opinion dated Feb. 22, 2016 issued in PCT/US2015/064126.
International Search Report and Written Opinion dated Apr. 19, 2016 issued in PCT/US2015/067498.
International Search Report and Written Opinion dated May 4, 2016 issued in PCT/US2016/015001.
International Search Report and Written Opinion dated May 11, 2016 issued in PCT/US2016/015002.

(56) References Cited

OTHER PUBLICATIONS

International Search Report and Written Opinion dated Jun. 27, 2016 issued in PCT/US2016/022116.
International Search Report and Written Opinion dated Jun. 30, 2016 issued in PCT/US2016/014343.
International Search Report and Wrtitten Opinion dated Sep. 5, 2016 issued in PCT/US2016/033638.
Chinese Office Action [Description in English] dated Jul. 11, 2016 issued in Application No. CN 201380068831.6.
Chinese Office Action [Description in English] dated Dec. 13, 2016 issued in Application No. CN201480057911.6.
Extended European Search Report dated Feb. 16, 2017 issued in Application No. 14837844.1.
Extended European Search Report dated Feb. 15, 2017 issued in Applicatoin No. 14832857.8.
Chinese Second Office Action [Description in English] dated Feb. 17, 2017 issued in Application No. CN201380068831.6.
International Preliminary Report on Patentability dated Jun. 15, 2017 issued in Application No. PCT/US2015/064126.
European Office Action dated May 16, 2017 issued in European Patent Application No. 13851670.3.
International Preliminary Report on Patentability dated Jul. 6, 2017 issued in Application No. PCT/US2015/067498.
International Preliminary Report on Patentability dated Aug. 3, 2017 issued in Application No. PCT/US2016/014343.
International Preliminary Report on Patentability dated Aug. 10, 2017 issued in Application No. PCT/US2016/015001.
International Preliminary Report on Patentability dated Aug. 10, 2017 issued in Application No. PCT/US2016/015002.
Chinese Third Office Action [Summary in English] dated Jul. 24, 2017 issued in Application No. 201380068831.6.
Chinese First Office Action [Summary in English] dated Aug. 2, 2017 issued in Application No. CN 201480054301.0.
Abramowitz, M., et al, "Field Curvature," Olympus Microscopy Resource Center, 2012 Olympus America Inc., pp. 1-3. [retrieved on Feb. 24, 2016] <URL:http://www.olympusmicro.com/primer/anatomy/fieldcurvature.html>.
Age-Related Macular Degeneration (AMD)|National Eye Institute. 2010 Table, pp. 1-8. [retrieved Apr. 5, 2016] <URL: https://www.nei.nih.gov/eyedata/amd#top.>.
Bian, L., et al, "Fourier ptychographic reconstruction using Poisson maximum likelihood and truncated Wirtinger gradient," Nature Publishing Group; Scientific Reports, vol. 6, No. 27384, Jun. 10, 2016, pp. 1-10. <doi: 10.1038/srep27384>.
BioTek® Brochure: BioTek's Multi-Mode Microplate Reading Techonologies, BioTek Instruments, Inc. pp. 2. [retrieved on Mar. 14, 2016] <URL: http://www.biotek.com>.
Bishara, W., et al, "Holographic pixel super-resolution in portable lensless on-chip microscopy using a fiber-optic array," NIH-PA, Lab Chip, Author manuscript; available in PMC Aug. 8, 2011, pp. 1-9. (Published in final edited form as: Lab Chip. Apr. 7, 2011; 11(7): 1276-1279. <doi:10.1039/c01c00684j>).
Bishara, W., et al, "Lensfree on-chip microscopy over a wide field-of-view using pixel super-resolution," Optics Express, vol. 18, No. 11, May 24, 2010, pp. 11181-11191. <doi: 10.1364/OE.18.011181>.
Born, M., et al, "Principles of Optics: Electromagnetic theory of propagation, interference and diffraction of light," Seventh (Expanded) Edition, Cambridge University Press, England 1999, pp. 1-31. [ISBN 0 521 642221 hardback].
Bunk, O., et al, "Influence of the overlap parameter on the convergence of the ptychographical iterative engine," Ultramicroscopy, vol. 108, (2008), pp. 481-487. <doi: 10.1016/j.ultramic.2007.08.003>.
Carroll, J., "Adaptive Optics Retinal Imaging: Applications for Studying Retinal Degeneration," Archives of Ophthalmology, vol. 126, No. 6, Jun. 9, 2008, pp. 857-858. [retrieved Feb. 24, 2016] <doi:10.1001/archopht.126.6.857>.

Chao, W. et al, "Soft X-ray microscopy at a spatial resolution better than 15 nm," Nature|Letters, vol. 435, Jun. 30, 2005, pp. 1210-1213. <doi:10.1038/nature03719>.
Choi, W., et al, "Tomographic phase microscopy," NPG: Nature Methods | Advance Online Publication, Aug. 12, 2007, pp. 1-3. <doi:10.1038/NMETH1078>.
Chung, J., et al, "Counting White Blood Cells from a Blood Smear Using Fourier Ptychographic Microscopy," PLoS ONE, vol. 10, No. 7, Jul. 17, 2015, pp. 1-10. <doi:10.1371/journal.pone.0133489>.
Chung, J., et al, "Wide field-of-view fluorescence image deconvolution with aberration-estimation from Fourier ptychography," Biomedical Optics Express, vol. 7, No. 2, Feb. 1, 2016, pp. 352-368. <doi: 10.1364/BOE.7.000352>.
Chung, J., et al, pre published manuscript of "Wide-field Fourier ptychographic microscopy using laser illumination source," ArXiv e-prints (Submitted on Feb. 9, 2016 (v1), last revised Mar. 23, 2016 (this version, v2)). [retrieved on May 20, 2016] <URL:arXiv:1602.02901v2 [physics.optics] Mar. 23, 2016>.
Debailleul, M., et al, "High-resolution three-dimensional tomographic diffractive microscopy of transparent inorganic and biological samples," Optics Letters, Optical Society of America, vol. 34, No. 1, Jan. 1, 2009, pp. 79-81. <doi: 10.1364/OL.34.000079>.
Dierolf, M., et al, "Ptychographic X-ray computed tomography at the nanoscale," Nature|Letter, vol. 467, Sep. 23, 2010, pp. 436-439. <doi:10.1038/nature09419>.
Dong, S., et al, "FPscope: a field-portable high-resolution microscope using a cellphone lens," Biomedical Optics Express, vol. 5, No. 10, Oct. 1, 2014, pp. 3305-3310. <doi:10.1364/BOE.5.003305>.
Dong, S., et al, "High-resolution fluorescence imaging via pattern-illuminated Fourier ptychography," Optics Express, vol. 22, No. 17, Aug. 25, 2014, pp. 20856-20870. <doi:10.1364/OE.22.020856>.
Essen BioScience, "Real-time, quantitative live-cell analysis, IncuCyte® ZOOM System," IncuCyte Zoom System Brochure 2016, pp. 1-4. [retrieved Feb. 25, 2016] [URL: http:/!www.essenbioscience.com/IncuCyte].
Gerke T.D., et al, "Aperiodic volume optics," Nature Photonics, vol. 4, Feb. 7, 2010, pp. 188-193. <doi:10.1038/nphoton.2009.290>.
Godara, P., et al, "Adaptive Optics Retinal Imaging: Emerging Clinical Applications," NIH-PA Author Manuscript; available in PMC Dec. 1, 2011. Published in final edited form as: Optom. Vis. Sci.. Dec. 2010; 87(12): 930-941. <doi: 10.1097/OPX.0b013e3181ff9a8b>.
Greenbaum, A., et al, "Field-portable wide-field microscopy of dense samples using multi-height pixel super-resolution based lensfree imaging," Lab Chip, The Royal Society of Chemistry, vol. 12, No. 7, Jan. 31, 2012, pp. 1242-1245. [retrieved on Feb. 27, 2016] <URL:http://dx.doi.org/10.1039/C2LC21072J>.
Guo, K., et al, "Optimization of sampling pattern and the design of Fourier ptychographic illuminator," Optics Express, vol. 23, No. 5, Mar. 9, 2015, pp. 6171-6180. <doi: 10.1364/OE.23.006171>.
Haigh, S. J., et al, "Atomic structure imaging beyond conventional resolution limits in the transmission electron microscope," Physical Review Letters, vol. 103, Issue 12, Sep. 18, 2009, pp. 126101.1-126101.4. <doi:10.1103/PhysRevLett.103.126101>.
Han, C., et al, "Wide Field-of-View On-Chip Talbot Fluorescence Microscopy for Longitudinal Cell Culture Monitoring from within the Incubator" Analytical Chemistry, vol. 85, No. 4, Jan. 28, 2013, pp. 2356-2360. <doi:10.1021/ac303356v>.
Hofer, H., et al, "Dynamics of the eye's wave aberration," Journal of Optical Society of America A., vol. 18, No. 3, Mar. 2001, pp. 497-506. <doi: 10.1364/JOSAA.18.000497>.
Hofer, H., et al, "Organization of the Human Trichromatic Cone Mosaic," The Journal of Neuroscience, vol. 25, No. 42, Oct. 19, 2005, pp. 9669-9679. <doi: 10.1523/JNEUROSCI.2414-05.2005>.
Hoppe, W., "Diffraction in inhomogeneous primary wave fields. 1. Principle of phase determination from electron diffraction interference." Acta Crystallographica Section a—Crystal Physics Diffraction Theoretical and General Crystallography, A25, Jan. 1, 1969, pp. 495-501. (English Machine Translation Incl.).
Horstmeyer, R., et al, "Diffraction tomography with Fourier ptychography," Optica, Optical Society of America, vol. 3, No. 8, Aug. 2016, pp. 827-835. <doi:10.1364/OPTICA.3.000827>.

(56) References Cited

OTHER PUBLICATIONS

Horstmeyer, R., et al, "Digital pathology with Fourier Ptychography," Computerized Medical Imaging and Graphics, vol. 42, Jun. 2015, pp. 38-43. <doi:10.1016/j.compmedimag.2014.11.005>.

Horstmeyer, R., et al, "Solving ptychography with a convex relaxation," New Journal of Physics, vol. 17, May 27, 2015, pp. 1-14. <doi: 10.1088/1367-2630/17/5/053044> [URL: http://iopscience.iop.org/1367-2630/17/5/053044].

Horstmeyer, R., et al, "Standardizing the resolution claims for coherent microscopy," Nature Photonics | Commentary, vol. 10, No. 2, Feb. 2016, pp. 68-71. <doi:10.1038/nphoton.2015.279> [URL: http://dx.doi.org/10.1038/nphoton.215.279].

Joeres, S., et al, "Retinal Imaging With Adaptive Optics Scanning Laser Ophthalmoscopy in Unexplained Central Ring Scotoma," Arch. Ophthalmol., vol. 126, No. 4, Apr. 2008, pp. 543-547. [retrieved Jun. 10, 2015] [URL: http://archopht.jamanetwork.com/].

Jung, J.H., et al, Author Manuscript of "Microfluidic-integrated laser-controlled microactuators with on-chip microscopy imaging functionality," Published in final edited form as: Lab Chip, Oct. 7, 2014, vol. 14, No. 19, pp. 3781-3789. <doi: 10.1039/c41c00790e>.

Kawata, S. et al, "Optical microscope tomography. I. Support constraint," Journal Optical Society America A, vol. 4, No. 1, Jan. 1987, pp. 292-297. <doi:10.1364/JOSAA.4.000292>.

Kay, D. B., et al, Author Manuscript of "Outer Retinal Structure in Best Vitelliform Macular Dystrophy," Published in final edited form as: JAMA Ophthalmol., Sep. 2013, vol. 131, No. 9, pp. 1207-1215. <doi: 10.1001/jamaophthalmol.2013.387>.

Kim, J., et al, "Incubator embedded cell culture imaging system (EmSight) based on Fourier ptychographic microscopy," Biomedical Optics Express, vol. 7, No. 8, Aug. 1, 2016, pp. 3097-3110. <doi: 10.1364/BOE.7.003097>.

Kim, M., et al, "High-speed synthetic aperture microscopy for live cell imaging," Optics Letters, vol. 36, No. 2, Jan. 15, 2011, pp. 148-150. <doi:10.1364/OL.36.000148>.

Kirkland, A.I., et al, "Multiple beam tilt microscopy for super resolved imaging," Journal of Electron Microscopy (Tokyo) Jan. 1, 1997, vol. 46, No. 1, pp. 11-22. [doi: 10.1093/oxfordjournals.jmicro.a023486].

Kirkland, A.I., et al, "Super-resolution by aperture synthesis: tilt series reconstruction in CTEM," Elsevier Science B.V., Ultramicroscopy 57, Mar. 1995, pp. 355-374. <doi: 10.1016/0304-3991(94)00191-O>.

Kozak, I., "Retinal imaging using adaptive optics technology," Saudi Journal of Ophthalmology, vol. 28, No. 2, Feb. 25, 2014, pp. 117-122. <doi:10.1016/j.sjopt.2014.02.005>.

Lauer, V., "New Approach to optical diffraction tomography yielding a vector equation of diffraction tomography and a novel tomographic microscope," Journal of Microscopy, Feb. 2002, vol. 205, No. 2, pp. 165-176. <doi: 10.1046/j.0022-2720.2001.00980.x>.

Lee, K., et al, "Synthetic Fourier transform light scattering," Optics Express, vol. 21, No. 19, Sep. 23, 2013, pp. 22453-22463. <doi:10.1364/OE.21.022453>.

Lu, H., et al, "Quantitative phase imaging and complex field reconstruction by pupil modulation differential phase contrast," Optics Express, vol. 24, No. 22, Oct. 31, 2016, pp. 25345-25361. <doi:10.1364/OE.24.025345>.

LUXEXCEL® Brochure, "LUXEXCEL: 3D Printing Service Description" pp. 1-5. [retrieved on Mar. 7, 2016] <URL: http://www.luxexcel.com.

Medoff, B.P., et al, "Iterative convolution backprojection algorithms for image reconstruction from limited data," Journal of the Optical Society of America, vol. 73, No. 11, Nov. 1, 1983, pp. 1493-1500. <doi: 10.1364/JOSA.73.001493>.

Meyer, R.R., et al, "A new method for the determination of the wave aberration function of high-resolution TEM. 2. Measurement of the antisymmetric aberrations," Ultramicroscopy, vol. 99, No. 2-3, May 2004, pp. 115-123. <doi: 10.1016/j.ultramic.2003.11.001>.

Moreno, I., "Creating a desired lighting pattern with an LED array," Proceedings of SPIE, Eighth International Conference on Solid State Lighting, vol. 705811, Sep. 2, 2008, pp. 9. <doi:10.1117/12.795673>.

Mrejen, S., et al, "Adaptive Optics Imaging of Cone Mosaic Abnormalities in Acute Macular Neuroretinopathy," Ophthalmic Surgery, Lasers & Imaging Retina, vol. 45, No. 6, Nov./Dec. 2014, pp. 562-569. <doi: 10.3928/23258160-20141118-12>.

Ou, X., et al, "Aperture scanning Fourier ptychographic microscopy," Biomedical Optics Express, vol. 7, No. 8, Aug. 1, 2016, pp. 3140-3150. <doi:10.1364/BOE.7.003140>.

Ou. X., et al, pre published manuscript of "Embedded pupil function recovery for Fourier ptychographic microscopy," (submitted on Dec. 26, 2013 (this version, v1); revised Feb. 12, 2014; accepted Feb. 17, 2014; published Feb. 24, 2014) pp. 1-13. <doi: 10.1364/OE.22.004960>.

Pacheco, S., et al, "Reflective Fourier Ptychography," Journal of Biomedical Optics, vol. 21, No. 2, Feb. 18, 2016, pp. 026010-1-026010-7. <doi: 10.1117/1.JBO.21.2.026010> [retrieved on Mar. 8, 2016] <URL: http://biomedicaloptics.spiedigitallibrary.org>.

Phillips, Z., et al, "Multi-Contrast Imaging and Digital Refocusing on a Mobile Microscope with a Domed LED Array," PLoS One, vol. 10, No. 5, May 13, 2015, pp. 1-13. <doi:10.1371/journal.pone.0124938>.

Reinhard, E., et al, "High Dynamic Range Imaging: Acquisition, Display, and Image-based Lighting" Second Edition § 5.2 HDR Image Capture: Morgan Kaufmann, May 28, 2010, pp. 148-151. <ISBN: 9780123749147>.

Rossi, E.A., et al, "In vivo imaging of retinal pigment epithelium cells in age related macular degeneration," Biomedical Optics Express, vol. 4, No. 11, Nov. 1, 2013, pp. 2527-2539. <doi: 10./1364/BOE.4.0025271.

Sankaranarayanan, Aswin C., et al, "CS-MUVI: Video Compressive Sensing for Spatial-Multiplexing Cameras," Proceedings of the IEEE International Conference Computational Photography (ICCP), Apr. 2012, pp. 11. <doi:10.1109/ICCPhot.2012.6215212>.

Tam, K., et al, "Tomographical imaging with limited-angle input," Journal of the Optical Society of America, vol. 71, No. 5, May 1981, pp. 582-592. <doi:doi.org/10.1364/JOSA.71.000582>.

Tian, L., et al, "3D differential phase-contrast microscopy with computational illumination using an LED array," Optics Letters, vol. 39, No. 5, Mar. 1, 2014, pp. 1326-1329. <doi:10.1364/OL39.001326>.

Tian, L., et al, "Computional illumination for high-speed in vitro Fourier ptychographic microscropy," Optica: Research Article, vol. 2, No. 10, Oct. 14, 2015, pp. 904-911. <doi:10.1364/OPTICA.2.000904>.

Vulovic, M., et al, "When to use the projection assumption and the weak-phase object approximation in phase contrast cryo-EM," Ultramicroscopy, vol. 136, Jan. 2014, pp. 61-66.<doi: 10.1016/j.ultramic.2013.08.002>.

Wang, Q., et al, "Adaptive Optics Microperimetry and OCT Images Show Preserved Function and Recovery of Cone Visibility in Macular Telangiectasia Type 2 Retinal Lesions," Investigative Ophthalmology Visual Science, vol. 56, No. 2, Feb. 2015, pp. 778-786. <doi:10.1167/iovs.14-15576> [retrieved on Apr. 5, 2016] [URL: http://iovs.arvojournals.org].

Williams, A., et al, "Fourier ptychographic microscopy for filtration-based circulating tumor cell enumeration and analysis," Journal of Biomedical Optics, vol. 19, No. 6, Jun. 20, 2014, pp. 066007.1-66007.8. <doi:10.1117/1.JBO.19.6.066007> [retrieved Feb. 10, 2016] <URL:http://biomedicaloptics.spiedigitallibrary.org>.

Wu, J., et al, "Harmonically matched grating-based full-field quantitative high-resolution phase microscope for observing dynamics of transparent biological samples," Optics Express, vol. 15, No. 26, Dec. 24, 2007, pp. 18141-18155. <doi:10.1364/OE.15.018141>.

Wu, J., et al, "Paired-angle-rotation scanning optical coherence tomography forward-imaging probe," Optics Letters, vol. 31, No. 9, May 1, 2006, pp. 1265-1267. <doi:10.1364/OL.31.001265>.

Yeh, et al., "Experimental robustness of Fourier ptychography phase retrieval algorithms," Optics Express, vol. 23, No. 26, Dec. 28, 2015, pp. 33214-33240. <doi: 10.1364/OE.23.033214>.

(56) References Cited

OTHER PUBLICATIONS

Zeiss, C., "Microscopy: Cells Need the Perfect Climate. System Solutions for Live Cell Imaging under Physiological Conditions," ZEISS Product Brochure, Carl Zeiss Microscopy GmbH Co., Feb. 2008, pp. 42. <URL: http://www.zeiss.de/incubation>.
Zhang, Y., et al, "Photoreceptor perturbation around subretinal drusenoid deposits as revealed by adaptive optics scanning laser ophthalmoscopy," HHS Public Access, Am J Ophthalmol. Author Manuscript,Sep. 1, 2015, pp. 22. (Published in final edited form as: Am J Ophthalmol. Sep. 2014; 158(3): 584-96.e1.).
Zheng, G., "Fourier Ptychographic Imaging: A MATLAB tutorial," IOP Concise Physics, Morgan & Claypool Publication, San Rafael, CA., May 2016, pp. 96. <ISBN: 978-1-6817-4272-4 (ebook)> <doi: 10.1088/978-1-6817-4273-1>.
U.S. Appl. No. 15/081,659, filed Mar. 25, 2016, Chung, J. et al.
U.S. Appl. No. 15/620,674, filed Jun. 12, 2017, Chung, J. et al.
U.S. Appl. No. 15/636,494, filed Jun. 28, 2017, Kim, J. et al.
Office Action dated May 19, 2017 in U.S. Appl. No. 15/081,659.
Office Action dated Aug. 31, 2017 in U.S. Appl. No. 15/636,494.
Notice of Allowance dated Sep. 20, 2017 in U.S. Appl. No. 15/007,196.
Notice of Allowance dated Oct. 11, 2017 in U.S. Appl. No. 14/572,493.
Notice of Allowance dated Oct. 20, 2017 in U.S. Appl. No. 15/081,659.
Office Action dated Nov. 3, 2017 in U.S. Appl. No. 15/068,389.
Office Action Interview Summary dated May 3, 2018 in U.S. Appl. No. 15/068,389.
Final Office Action dated Jun. 6, 2018 issued in U.S. Appl. No. 15/068,389.
Office Action dated Nov. 30, 2017 in U.S. Appl. No. 15/007,159.
Notice of Allowance dated Dec. 4, 2017 in U.S. Appl. No. 14/065,305.
Final Office Action dated Dec. 14, 2017 in U.S. Appl. No. 14/960,252.
Final Office Action dated Jan. 17, 2018 in U.S. Appl. No. 14/658,019.
Notice of Allowance dated Jan. 23, 2018 in U.S. Appl. No. 15/206,859.
Office Action dated Jan. 25, 2018 in U.S. Appl. No. 14/065,280.
Notice of Allowance dated Jan. 26, 2018 in U.S. Appl. No. 15/209,604.
Notice of Allowance dated Feb. 9, 2018 in U.S. Appl. No. 15/081,659.
Office Action dated Apr. 4, 2018 issued in U.S. Appl. No. 15/003,559.
Office Action dated Apr. 13, 2018 issued in U.S. Appl. No. 15/160,941.
European Extended Search Report dated Jun. 6, 2018 issued in Application No. 15865492.1.
Australian Office Action dated Sep. 18, 2017 issued in Application No. AU 2014296034.
International Preliminary Report on Patentability dated Sep. 28, 2017 issued in Application No. PCT/US2016/022116.
Japanese Office Action dated Oct. 17, 2017 issued in Application No. 2015-539884.
Chinese Office Action [Summary in English] dated Oct. 26, 2017 issued in CN 201480057911.6 .
International Preliminary Report on Patentability dated Nov. 30, 2017 issued in PCT/US2016/033638.
Australian Examination Report 1/Office Action dated Jan. 18, 2018 issued in AU 2014308673.
Chinese First Office Action dated Feb. 24, 2018 issued in CN 201680003937.1.
Abrahamsson, S., et al., "Fast multicolor 3D imaging using aberration-corrected mulitfocus microscopy," Brief Communications: Nature Methods, vol. 10, No. 1, Jan. 2013, pp. 60-65. <doi:10.1038/nmeth. 2277>.

Holloway, J., et al. "SAVI: Synthetic apertures for long-range, subdiffraction-limited visible imaging using Fourier ptychography," Science Advances | Research Article, vol. 3, No. 4, Apr. 14, 2017, pp. 1-11. <doi:10.1126/sciadv.1602564> [retrieved on Nov. 28, 2017] <URL:http://advances.sciencemag.org/>.
Jenson, et al. "Types of imaging, Part 2: An Overview of Fluorescence Microscopy." The Anatomical Record, vol. 295, No. 10, Oct. 1, 2012, pp. 1621-1627.
Kner, P., "Phase diversity for three-dimensional imaging," Journal of the Optical Society of America A, vol. 30, No. 10, Oct. 1, 2013, pp. 1980-1987. <doi:10.1364/JOSAA.30.001980>.
Wills, S., "Synthetic Apertures for the Optical Domain," Optics & Photonics News Article [webpage], The Optical Society (OSA), Apr. 18, 2017, pp. 2. <URL:https://www.osa-opn.org/home/newsroom/2017/april/synthetic_apertures_for_the_optical_domain/>.
Zheng, G., et al, "Wide-field, high-resolution Fourier ptychographic microscopy," Nature Photonics, vol. 7, Sep. 2013, Published Online Jul. 28, 2013, pp. 739-746. <doi:10.1038/NPHOTON.2013.187>.
U.S. Appl. No. 15/963,966, filed Apr. 26, 2018, Ou et al.
U.S. Appl. No. 15/959,050, filed Apr. 20, 2018, Horstmeyer et al.
Preliminary Amendment dated Jun. 13, 2018 filed in U.S. Appl. No. 15/820,295.
U.S. Notice of Allowance dated Jun. 27, 2018 in U.S. Appl. No. 15/636,494.
U.S. Notice of Allowance dated Jul. 16, 2018 in U.S. Appl. No. 15/007,159.
Extended European Search Report dated Jul. 3, 2018 issued in Application No. EP 15874344.3.
Jacques, et al., "Imaging Superficial Tissues With Polarized Light," Lasers in Surgery and Medicine, vol. 26, No. 2, Apr. 25, 2000, pp. 119-129.
Sarder, et al. "Deconvolution Methods for 3-D Fluorescence Microscopy Images," IEEE Signal Processing Magazine, vol. 23, No. 3, May 2006, pp. 32-45.
Preliminary Amendment filed Jul. 11, 2018 in U.S. Appl. No. 15/959,050.
Japanese First Office Action dated Jul. 31, 2018 issued in Application No. JP 2016-531919.
Extended European Search Report dated Aug. 8, 2018 issued in Application No. EP 16744002.3.
Chinese Second Office Action dated Jul. 3, 2018 issued in Application No. CN 201480054301.0.
Chinese Third Office Action dated Jul. 13, 2018 issued in CN 201480057911.6.
Preliminary Amendment filed Jul. 23, 2018 in U.S. Appl. No. 15/963,966.
Chinese Office Action [Description in English] dated May 31, 2016 issued in Application No. CN 201380068831.6.
Chinese Second Office Action [Description in English] dated Jan. 22, 2017 issued in Application No. CN201380068831.6.
Notice of Allowance dated Sep. 17, 2018 in U.S. Appl. No. 15/820,295.
U.S. Office Action dated Oct. 4, 2018 in U.S. Appl. No. 14/658,019.
U.S. Notice of Allowance dated Oct. 5, 2018 in U.S. Appl. No. 15/636,494.
U.S. Office Action dated Sep. 7, 2018 in U.S. Appl. No. 14/979,154.
European Extended Search Report dated Aug. 14, 2018 issued in EP 16744003.1.
Extended European Search Report dated Sep. 12, 2018 issued in Application No. EP 16740769.1.
U.S. Appl. No. 16/162,271, filed Oct. 16, 2018, Kim et al.

* cited by examiner

PTYCHOGRAPHY IMAGING SYSTEMS AND METHODS WITH CONVEX RELAXATION

CROSS-REFERENCES TO RELATED APPLICATIONS

This application claims priority to U.S. Provisional Patent Application No. 61/992,505 titled "Solving Conventional and Fourier Ptychography with Convex Optimization," filed on May 13, 2014, which is hereby incorporated by reference in its entirety and for all purposes.

BACKGROUND

Certain embodiments described herein are generally related to digital imaging, and more specifically, to standard and Fourier ptychographic imaging systems and methods with convex relaxation.

Ptychography imaging involves collecting lower resolution images and then reconstructing the image data to form a higher resolution image. Over the past two decades, ptychographic imaging has been used in a variety of regimes to produce high-resolution, wide field-of-view images of microscopic and nanoscopic phenomena. Whether in the X-ray regime at third-generation synchrotron sources, in the electron microscope for atomic scale phenomena, or in the in the optical regime for biological specimens, ptychography has shown an unparalleled ability to acquire hundreds of megapixels of sample information near the diffraction limit. Typically, the underlying operation of ptychography is to sample a series of diffraction patterns from a specimen as it is scanned through a focused beam. These intensity-only measurements are then reconstructed into a complex (i.e. amplitude and phase), high-resolution image with more pixels of sample information than any single recorded diffraction pattern.

Most recently, a Fourier ptychographic microscope (FPM) was introduced that uses a Fourier ptychographic technique that can reconstruct gigapixel optical images from a sequence of lower resolution images collected using a low NA objective lens from a conventional microscope. In one example, Fourier ptychographic microscope activates different LEDs in an LED array to illuminate a sample from different directions while the low-resolution images are captured. As in standard ptychography, Fourier ptychography recovers the sample's phase as it merges together the captured image sequence into a high-resolution output.

Conventional ptychographic imaging systems can avoid the need for a high NA, well-corrected objective lens to image at the diffraction-limit by resolving resolution-limiting factors in their data capture and reconstruction techniques. However, these systems lack stable, robust, and accurate reconstruction methods. For example, conventional ptychographic systems reconstruct the phase of the scattered field from measured intensities using non-convex algorithms. Most of these conventional systems solve the phase retrieval problem by applying known constraints in an iterative manner using an "alternating projection" (AP) strategy. Reconstruction techniques that use AP strategies tend to converge to incorrect local minima and/or to stagnate.

SUMMARY

Certain aspects of this disclosure pertain to standard and Fourier ptychographic imaging systems and methods with convex relaxation.

Certain aspects pertain to ptychographic imaging systems with convex relaxation. In some aspects, a ptychographic imaging system with convex relaxation comprises one or more electromagnetic radiation sources, a digital radiation intensity detector, and a processor in communication with the digital radiation detector. In some cases, the one or more electromagnetic radiation sources configured to provide coherent radiation to a specimen from a plurality of incidence angles at a sequence of sample times. For example, the one or more electromagnetic radiation sources may be an LED array. The digital radiation intensity detector configured to receive light transferred from the sample by diffractive optics. In these cases, the digital radiation intensity detector further configured to capture intensity distributions for a sequence of low resolution intensity images associated with the plurality of incidence angles. The processor in communication with the digital radiation detector to receive image data with intensity distributions for the sequence of low resolution intensity images. The processor configured to generate a convex problem based on the sequence of low resolution intensity images and optimize the convex problem to reconstruct a high-resolution image of the specimen. In other cases, the diffractive optics comprises a spatial light modulator configured to provide a pattern at a plurality of locations at a Fourier plane of the specimen. In these cases, the sequence of low resolution images capture by the digital radiation detector is associated with the plurality of locations of the pattern.

Certain aspects pertain to ptychographic imaging methods with convex relaxation. In some aspects, a ptychographic imaging method with convex relaxation comprises collecting a sequence of low resolution images of a specimen, generating a convex problem based on the sequence of low resolution intensity images, and optimizing the convex problem to reconstruct a high-resolution image of the specimen. In some cases, collecting a sequence of low resolution images of a specimen comprises providing coherent radiation to a specimen from a plurality of incidence angles at a sequence of sample times, transferring light from the specimen through diffractive optics to a digital radiation intensity detector, and sampling a sequence of low resolution intensity images associated with the plurality of incidence angles. In some cases, generating the convex problem comprises stacking image data from the low-resolution images into a combined image matrix, constructing measurement matrices, and generating the convex problem using convex relaxation.

These and other features are described in more detail below with reference to the associated drawings.

DETAILED DESCRIPTION

Figure 1:
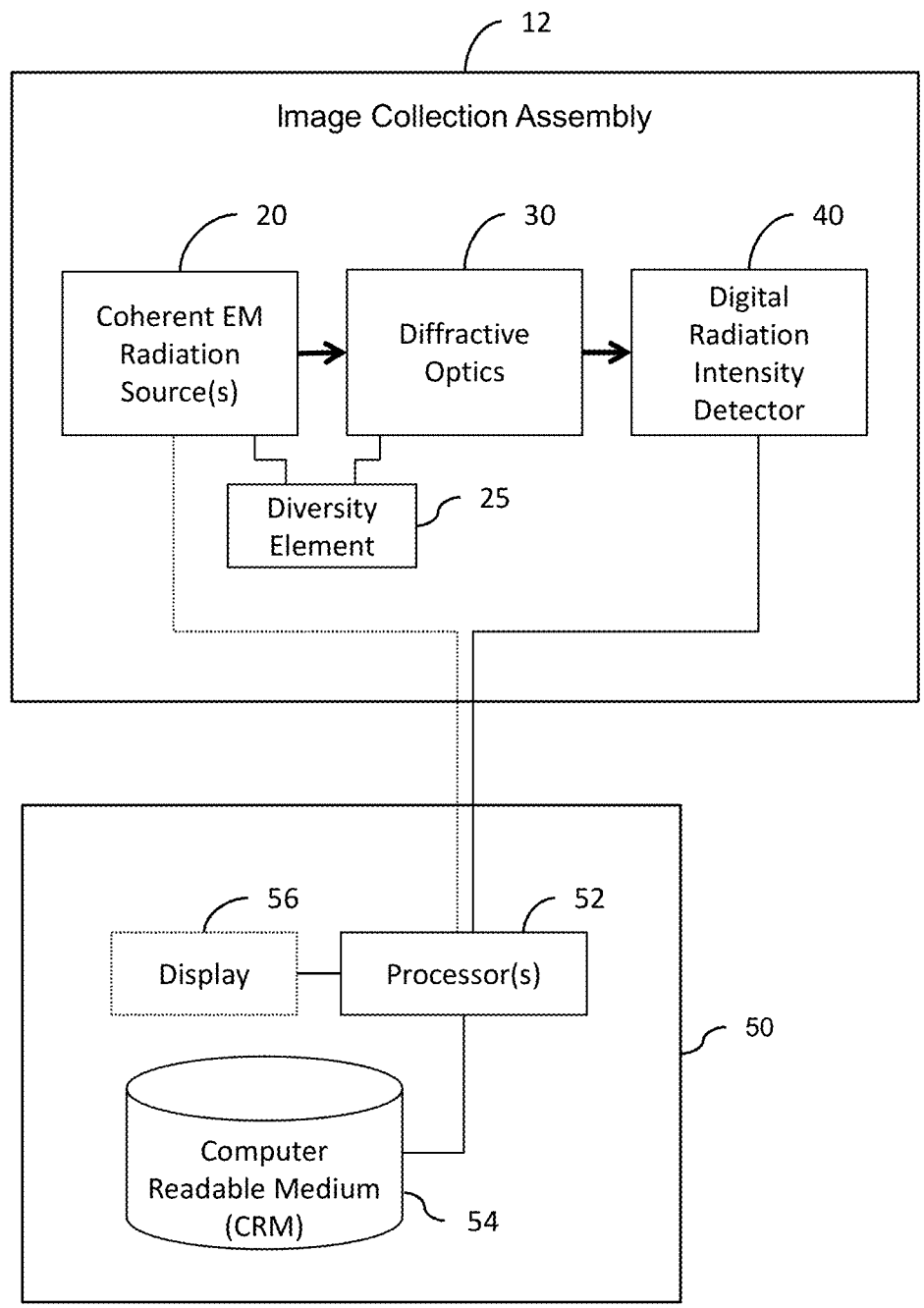
FIG. 1 is a block diagram of components of a (standard or Fourier) ptychographic imaging system with convex relaxation, according to embodiments.

Embodiments of the present invention will be described below with reference to the accompanying drawings. The features illustrated in the drawings may not be to scale.

Certain aspects are directed to ptychographic (standard or Fourier) imaging systems and methods with convex relaxation. Typically, these ptychographic (standard or Fourier) imaging systems comprise coherent electromagnetic (EM) radiation sources for illuminating the specimen, diffraction optics, and a digital radiation intensity detector for taking intensity measurements. The imaging method with convex relaxation starts by providing coherent EM radiation to illuminate the specimen being imaged. The diffractive optics receives light from the specimen and transfers diffraction patterns to the digital radiation intensity detector, which samples intensity measurements at a sequence of sample times. In the case of a standard ptychography imaging system, the diffraction optics are free-space propagation. In the case of a Fourier ptychography imaging system, the diffraction optics are a combination of free-space propagation and a collection optical element. The digital intensity measurements captured at each sample time provide image data of a low-resolution image. The method reconstructs a high resolution image from the image data of the sequence of low-resolution images. This method manipulates the image matrix to form a convex problem by stacking the reduced resolution images in combined matrix, constructing measurement matrices, and using convex relaxation to create the convex program. The method then reconstructs a high resolution image from the convex image matrix by either (Option A) relaxing the convex image matrix into low-rank formulation and then solving the low-rank image matrix using a low-rank ptychography (LRP) process or (Option B) determining the high resolution image directly with a convex lifted ptychography (CLP) technique.

Certain aspects are directed to ptychographic (standard or Fourier) imaging systems and methods with convex relaxation. In some aspects, ptychographic imaging systems and methods with convex relaxation may provide the desired stability, robustness and/or reliability in reconstructing high resolution images from a collection of lower resolution images. In some aspects, these ptychographic imaging systems and methods use reconstruction techniques with convex relaxation that do not have local minima, incorporate noise compensation techniques, and/or use multiple a priori constraints. In one aspect, a reconstruction technique with convex relaxation uses low-rank factorization, whose runtime and memory usage are near-linear with respect to the size of the output image. In this example, the reconstruction technique may be able to provide 25% lower background variance than conventional ptychographic reconstruction methods.

In certain aspects, ptychographic imaging systems and methods with convex relaxation include an unaided recovery technique that does not use prior sample knowledge or an appropriate heuristic, which may be especially relevant in biological imaging. Moreover, these imaging systems and methods do not have local minima so that a single solution can be found efficiently. In addition, these imaging systems and methods are more noise-tolerant than imaging systems that use AP strategies, which makes results more reproducible. Furthermore, a factorization technique can be implemented to obtain solutions at scale. Thus, these aspects provide noise-tolerant and efficient reconstruction techniques that may provide for more efficiently and accurately processing multi-gigapixel high resolution images than conventional systems.

I. Ptychographic Imaging Systems with Convex Relaxation

FIG. 1 is a block diagram of components of a (standard or Fourier) ptychographic imaging system with convex relaxation 10, according to embodiments. As shown, the system 10 comprises an image collection assembly 12 comprising one or more coherent electromagnetic (EM) radiation sources 20, a diversity element 25, diffractive optics 30, and a digital radiation intensity detector 40 for taking intensity measurements to sample a series of diffraction patterns of the specimen. In operation, the one or more coherent EM radiation source(s) 20 provides coherent EM radiation to illuminate the specimen being imaged. A collection optical element of the diffractive optics 30 receives light (depicted by an arrow) from the specimen and other element(s) of the diffractive optics 30 provide diffraction patterns (depicted by an arrow) of the specimen at the digital radiation intensity detector 40. The digital radiation intensity detector 40 samples intensity measurements at a sequence of sample times. The intensity measurements captured at the digital radiation intensity detector 40 at each sample time provide image data of a low-resolution image. The system 10 reconstructs one or more high resolution images from the image data of the sequence of low-resolution images using convex relaxation. This method manipulates the image matrix to form a convex problem by stacking the reduced resolution images in a combined matrix, constructing measurement matrices, and using convex relaxation to create a convex program. The method then reconstructs a high resolution image from the image matrix, which are both connected through a convex program, by either (Option A) relaxing the convex program into a low-rank formulation and then solving the low-rank formulation using a low-rank ptychography (LRP) process or (Option B) determining the high resolution image directly from the convex program with a convex lifted ptychography (CLP) process.

As mentioned above, the image collection assembly 12 comprises a diversity element 25 that may be a feature(s) of either the one or more coherent EM radiation sources 20 or the diffractive optics 30. The diversity element 25 refers to one or more feature(s) that implement a change between sample times to cause diversity in the captured image data. In some cases, the diversity element 25 may be provided by configuring the one or more coherent EM radiation sources 20 with multiple light sources (i.e. point emitters) providing illumination from different incidence angles to the specimen during sampling. For example, the coherent EM radiation sources 20 may be in the form of a two-dimensional LED array (n×m dimensions) of LEDs acting as point emitting light sources at different locations at the illumination plane of the two-dimensional LED array. In another example, the diversity element 25 may be provided by mechanically shifting the specimen to different locations at the sample plane using, for example, an X-Y stage. In another example, the diversity element 25 may be provided by configuring the diffractive optics 30 to comprise a spatial light modulator with its display located at the Fourier plane. The diversity can then be generated during sampling by displaying a pattern at different locations on the spatial light modulator display. In yet another example, the diversity element 25 may be provided by shifting another coded mask around the Fourier plane.

In some cases, the one or more coherent EM radiation sources 20 and diffractive optics 30 are configured to operate in a trans-illumination mode directing illumination through the specimen and toward a collection element of the diffractive optics 30. In other cases, the one or more coherent EM radiation sources 20 and diffractive optics 30 are configured in epi-illumination mode directing illumination toward the specimen and away from a collection element of the diffractive optics 30.

In certain aspects, a digital radiation intensity detector comprises a two-dimensional grid of equally spaced discrete elements (e.g., pixels) at a detection plane. At each sample time, each element samples intensity of radiation received. As a group, the grid samples a two-dimensional intensity distribution associated with the location of the elements. The digital radiation intensity detector generates a signal(s) with frames of image data of the intensity distribution measured by the grid of radiation detecting elements at the detection plane at each sample time. If visible light radiation is being used to illuminate the specimen, the digital radiation intensity detector may be in the form of a charge coupled device (CCD), a CMOS imaging sensor, an avalanche photo-diode (APD) array, a photo-diode (PD) array, a photomultiplier tube (PMT) array, or like device. If using THz radiation is used, the digital radiation intensity detector may be, for example, an imaging bolometer. If using microwave radiation, the digital radiation intensity detector may be, for example, an antenna. If X-ray radiation is used, the digital radiation intensity detector may be, for example, an x-ray sensitive CCD. If acoustic radiation is used, the digital radiation intensity detector may be, for example, a piezo-electric transducer array. These examples of digital radiation intensity detectors and others are commercially available. In some aspects, the digital radiation intensity detector may be a color detector e.g., an RGB detector. In other aspects, the digital radiation intensity detector may be a monochromatic detector.

As shown in FIG. 1, the ptychographic imaging system with convex relaxation 10 further comprises a computing device 50. The computing device 50 comprises one or more processors 52 (e.g., microprocessors), a computer readable medium (CRM) 54, and an optional (denoted by dotted line) display 56. The computing device 50 can be in various forms such as, for example, a smartphone, laptop, desktop, tablet, etc. The one or more processors 52 are in communication with the digital radiation intensity detector 40 to receive signal(s) with digital image data associated with the low-resolution images. In some cases, the one or more processors 50 may also send control signal(s) to the digital radiation intensity detector 40 to control the sampling. The one or more processors 50 are optionally (denoted by dotted line) in direct communication with the coherent electromagnetic radiation sources 20. In some cases, the one or more processors 50 send control signal(s) for controlling the timing and incidence angles of the illumination. The optional (denoted by dotted line) display 56 is in communication with the processor(s) 52 to receive data for displaying images and other output, for example, to an operator of the system 10. The CRM 54 (e.g., memory) is in communication with the processor(s) 52 for receiving data and sending data stored on the CRM 54. The electrical communication between components of system 10 and other imaging systems described herein can be in wired or wireless form.

The one or more processors 52 may receive instructions stored on the CRM 54 (e.g., memory) and execute those instructions to perform one or more functions of system 10. For example, the processor(s) 52 may execute instructions to perform one or more steps of the imaging with convex relaxation method. For example, the processor(s) 52 may execute instructions stored on the CRM 54 to perform one or more functions of the system 10 such as, for example, 1) interpreting image data, 2) reconstructing a higher resolution image from the image data, and 3) providing display data for displaying one or more images or other output on the display 56. As another example, the processor(s) 52 may provide control instructions for controlling the illumination to the coherent EM radiation source(s) 20. In one case, the processor(s) 52 may provide control instructions to synchronize the illumination by coherent EM radiation source(s) 20 with the sampling times of the digital radiation intensity detector 40. In addition to storing instructions for preforming certain functions of the system 10, the CRM 54 can also store the (lower resolution) intensity and higher resolution image data, and other data produced by the system 10. The display 56 may be a color display or a black and white display. In addition, the display 56 may be a two-dimensional display or a three-dimensional display. In one embodiment, the display 56 may be capable of displaying multiple views.

Figure 2:
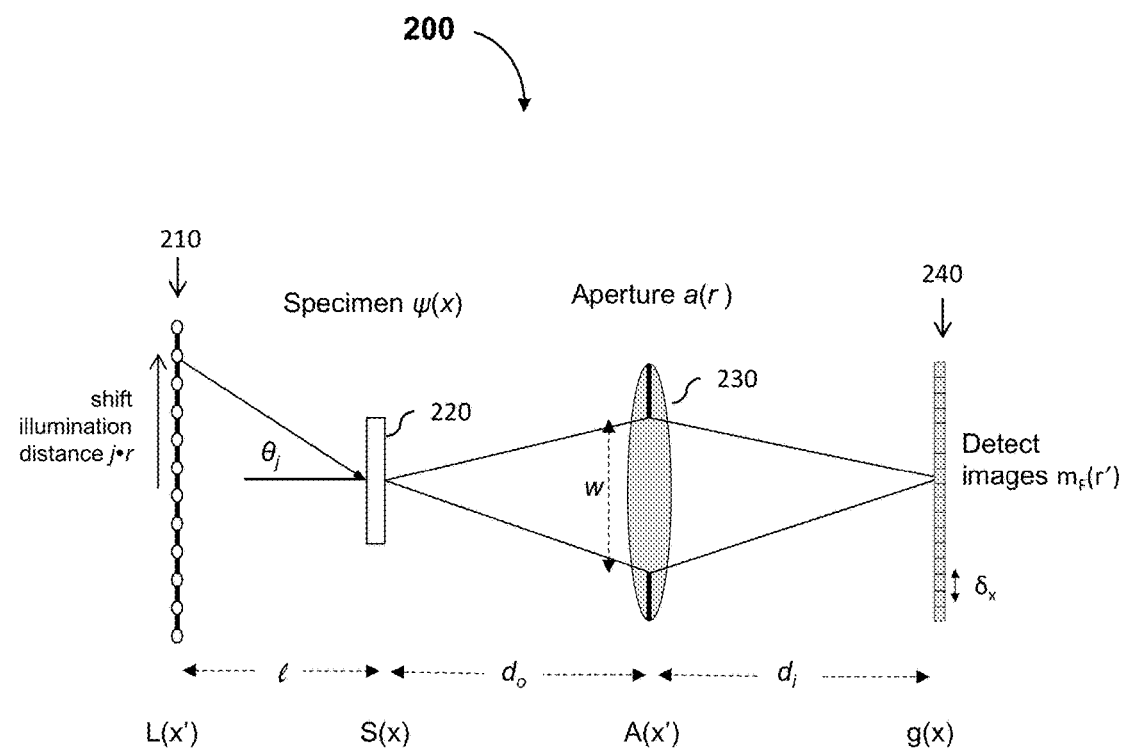
FIG. 2 is a schematic drawing of a side view of components of a Fourier ptychographic imaging system with convex relaxation of a first configuration, according to an embodiment.
Figure 3:
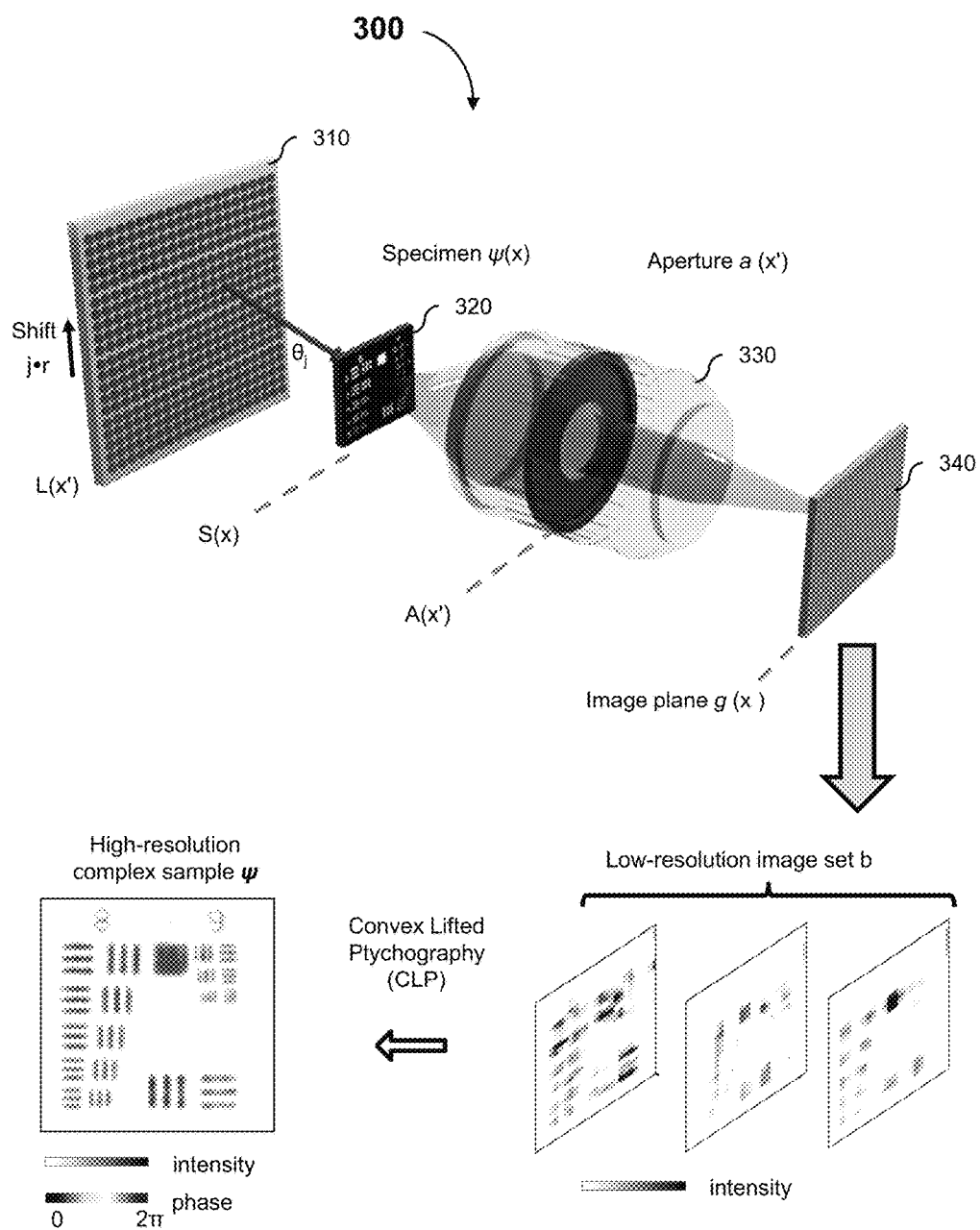
FIG. 3 are schematic drawings of (top) components of the Fourier ptychographic imaging system with convex relaxation of a first configuration and (bottom) certain steps of a ptychographic imaging with convex relaxation method, according to an embodiment.
Figure 4A:
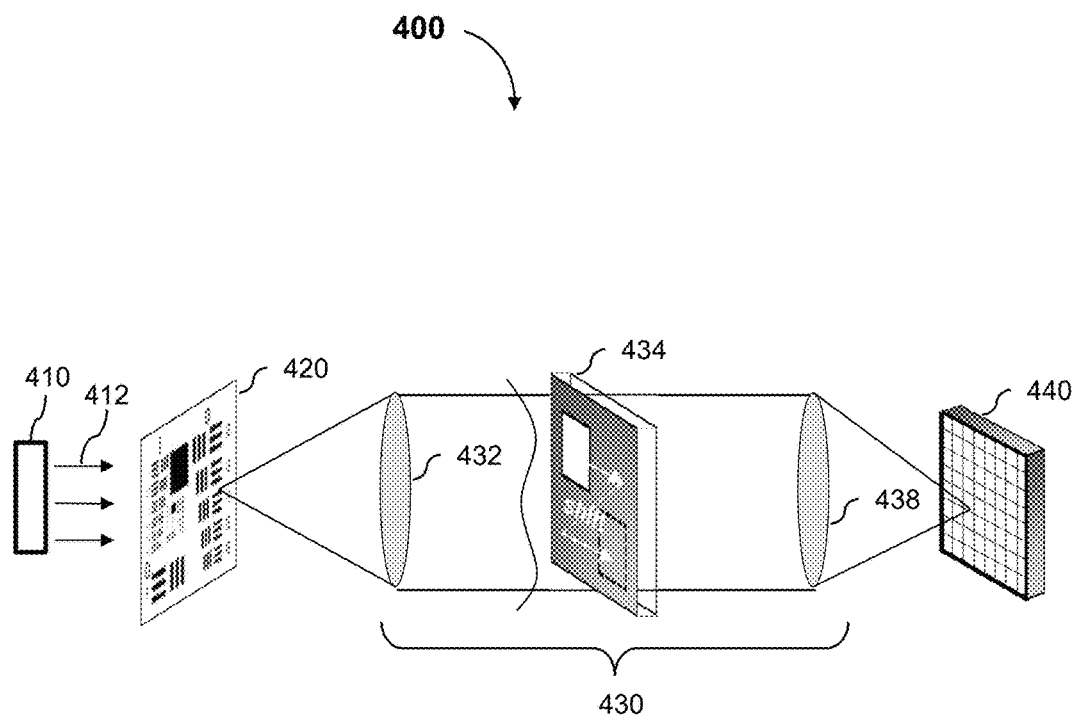
FIG. 4A is a schematic drawing of a side view of components of a Fourier ptychographic imaging system with convex relaxation of a second configuration, according to embodiments.
Figure 4B:
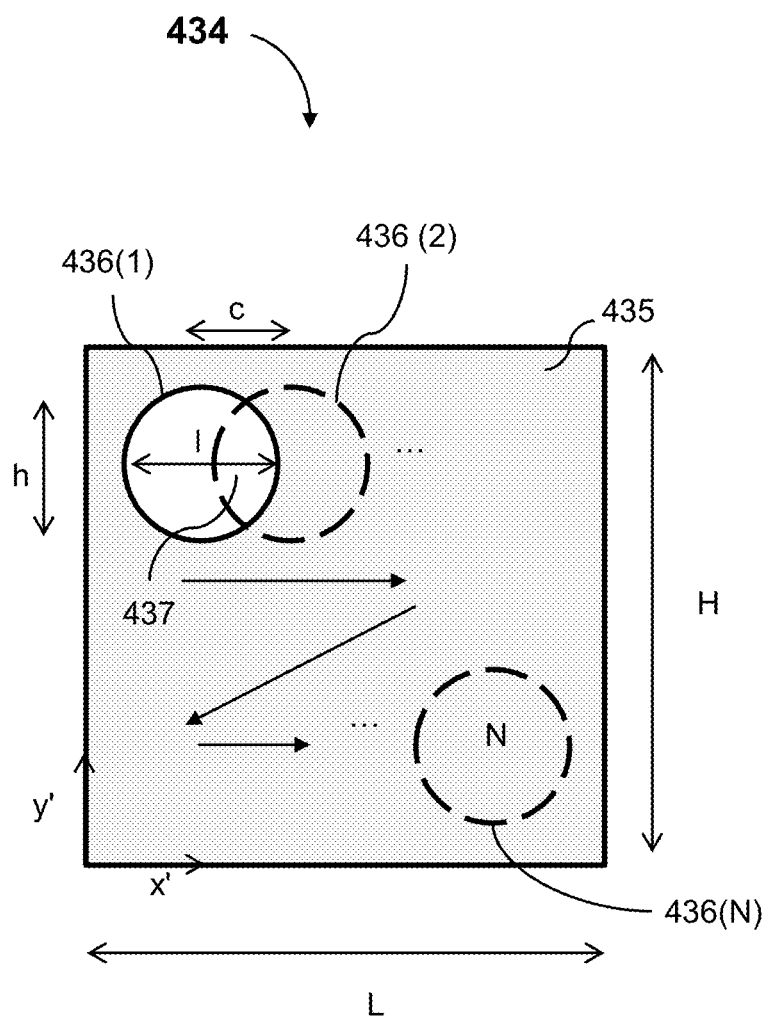
FIG. 4B is a schematic drawing of a front view of a display of the spatial light modulator of FIG. 4A.
Figure 5:
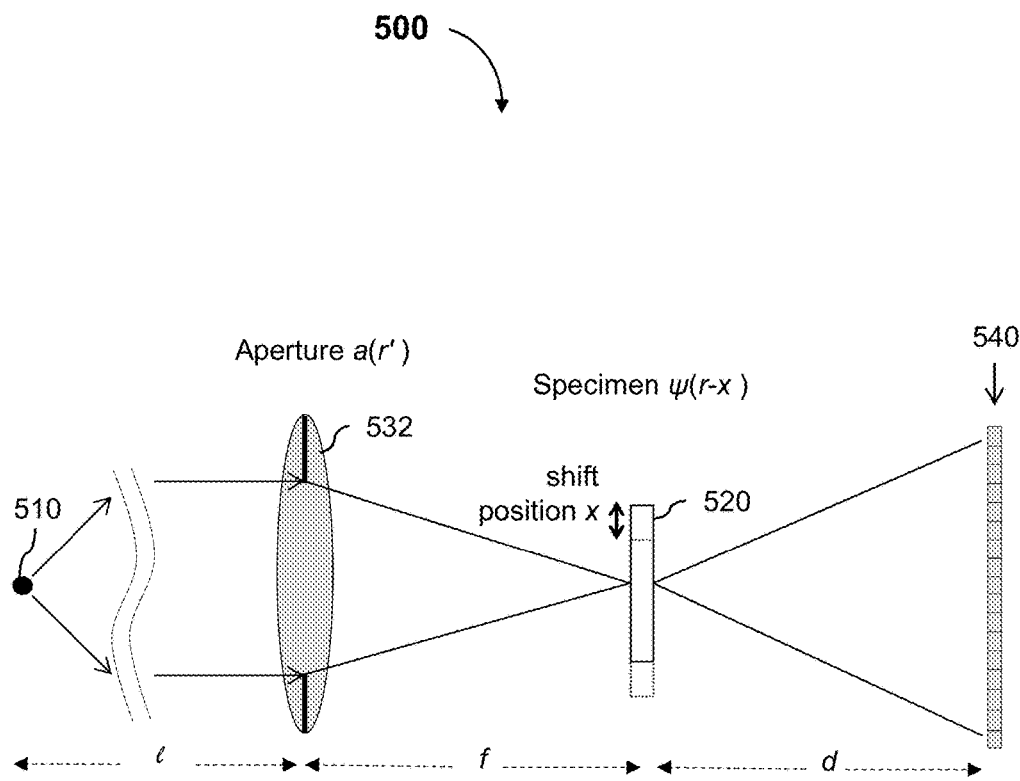
FIG. 5 is a schematic drawing of components of a standard ptychographic imaging system with convex relaxation, according to an embodiment.
Figure 6:
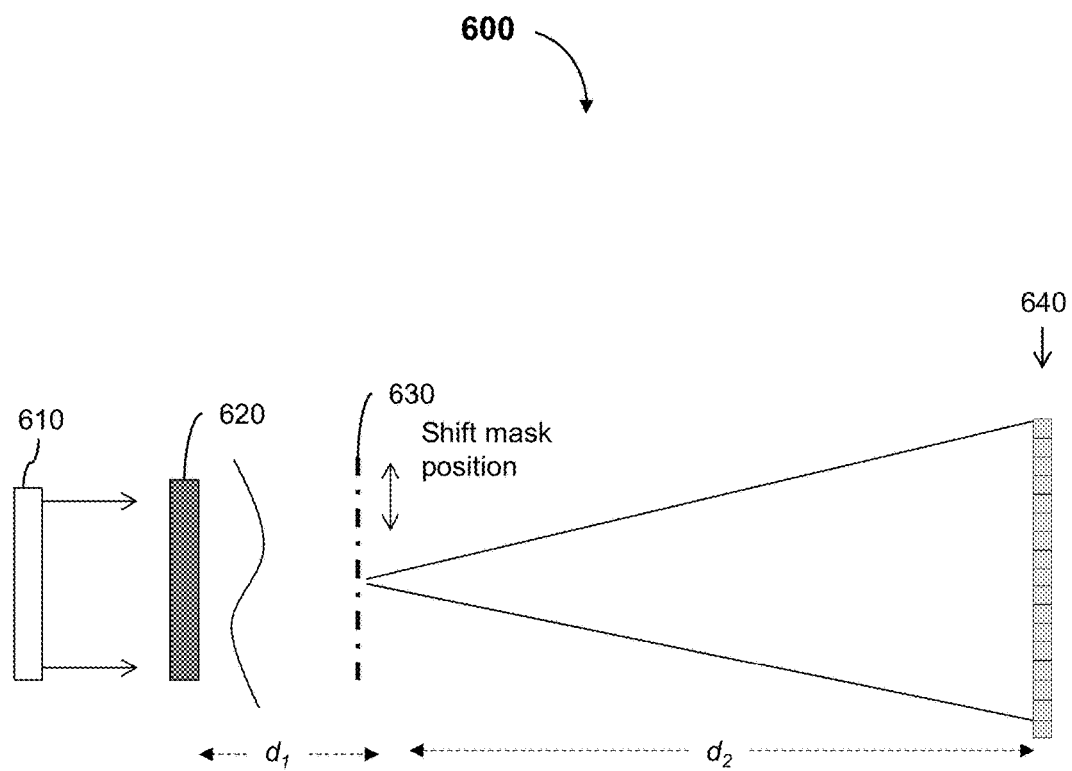
FIG. 6 is a schematic drawing of a coded aperture diffraction imaging system with convex relaxation with an image collection assembly, according to an embodiment.

FIGS. 2-5 provide illustrations of different configurations of components of the ptychographic imaging system with convex relaxation 10 described with respect to FIG. 1. FIG. 2 and FIG. 3 provide illustrations of Fourier ptychographic imaging systems with an image collection assembly in a first configuration sometimes referred to as "FPM-A." Some details of components of imaging collection assemblies of this first configuration can be found in U.S. patent application Ser. No. 14/065,280, titled "FOURIER PTYCHOGRAPHIC IMAGING SYSTEMS, DEVICES, AND METHODS," filed on May 1, 2014, and in U.S. patent application Ser. No. 14/572,493, titled "EMBEDDED PUPIL FUNCTION RECOVERY FOR FOURIER PTYCHOGRAPHIC IMAGING DEVICES," filed on Dec. 16, 2014, which are hereby incorporated by reference in their entirety. The drawings in FIGS. 4A-4B illustrate components of a Fourier ptychographic imaging system with an image collection assembly in a second configuration sometimes referred to as "FPM-B," according to an embodiment. Some details of components of imaging collection assemblies of this second configuration can be found in U.S. patent application Ser. No. 14/448,850, titled "APERTURE SCANNING FOURIER PTYCHOGRAPHIC IMAGING," filed on Jul. 31, 2014, which is hereby incorporated by reference in its entirety. The drawing in FIG. 5 illustrates a "standard" ptychographic imaging system with an image collection assembly in a third configuration, according to an embodiment. FIG. 6 is a schematic drawing of a coded aperture diffraction imaging system with convex relaxation with an image collection assembly in a fourth configuration, according to an embodiment.

More specifically, FIG. 2 is a schematic drawing of a side view of a Fourier ptychographic imaging system with convex relaxation 200, according to embodiments. The system 200 comprises an image collection assembly in a first configuration sometimes referred to as "FPM-A." The system 200 comprises coherent EM radiation sources 210 at plane L(x'). The coherent EM radiation sources 210 are illustrated in the form of a two-dimensional LED array of j illumination sources (i.e. LEDs). The coherent EM radiation sources 210 are configured (e.g., receive and execute control instructions) to shift illumination a distance j·r at plane L(x') to illuminate a specimen (sample) ψ(x) 220 at a sample plane S(x) at j incidence angles. It would be understood that the illumination sources are at different locations in both the y-direction and the z-direction in the plane L(x'). In the illustration, the $j^{th}$ illumination source is illuminating the specimen ψ(x) 220 at an incidence angle of $θ_j$. The system 200 further comprises low NA lens 230 at aperture plane A(x') having an aperture a(r) associated with the NA of the lens 230. The low NA lens 230 receives and filters (accepts light based on NA) light based on the aperture a(r) from the illuminated specimen 220. The aperture plane A(x') is located at a Fourier plane of the specimen plane. The system 200 further comprises a digital radiation intensity detector 240 at a plane g(x) for detecting intensity images $m_F(r')$. In this example, diversity is provided by shifting illumination sources to different locations at the illumination plane by activating different sets of one or more LEDs at different locations of the LED array. Each LED is configured to provide coherent EM illumination. To collect the low-resolution images, the low NA lens 230 receives illumination altered by the specimen and filters the illumination based on its low NA. The digital radiation intensity detector 240 receives the filtered illumination from the low NA lens 230 and samples a sequence of j low-resolution images at j sample times during illumination by the j illumination sources. Each low-resolution image is captured at a different sample time during illumination from a different incidence angle.

FIG. 3 are schematic drawings of (top) components of the Fourier ptychographic imaging system with convex relaxation 300 and (bottom) certain steps of a ptychographic imaging with convex relaxation method, according to an embodiment. The components of the Fourier ptychographic imaging system with convex relaxation 300 shown in FIG. 3 are also in the first configuration sometimes referred to as "FPM-A." The Fourier ptychographic imaging system with convex relaxation 300 comprises coherent EM radiation sources 310 at plane L(x') in the form of a two-dimensional LED array of j illumination sources i.e. LEDs. The coherent EM radiation sources 310 are configured to shift illumination a distance j·r at plane L(x') to illuminate a specimen ψ(x) 320 at a sample plane S(x) at j incidence angles. In the illustration, the $j^{th}$ illumination source is illuminating the specimen ψ(x) 320 at an incidence angle of $θ_j$. The system 300 further comprises diffractive optics 330 comprising a low NA lens at a plane A(x') with an aperture a(r) associated with its low NA that receives and filters (i.e. accepts based on NA) light from the illuminated specimen 320. The plane A(x') is located at a Fourier plane of the specimen plane. The system 300 further comprises a digital radiation intensity detector 340 at an image plane g(x) for detecting intensity images. In this example, diversity is provided by shifting illumination sources to different locations at the illumination plane e.g., by activating different sets of one or more LEDs at different locations of the LED array. Each LED is configured to provide coherent uniform EM illumination. Although system 200 and system 300 comprise a diffractive optics with a filtering low NA lens, a higher NA lens may be used in other embodiments.

To collect low-resolution images using the illustrated Fourier ptychographic imaging system with convex relaxation 300, the low NA lens 330 receives illumination altered by the specimen and filters the illumination based on its low NA. The digital radiation intensity detector 340 receives the filtered illumination from the low NA lens 330 and samples a low-resolution image set b comprising a sequence of j low-resolution images at j sample times during illumination by the j illumination sources. Each low-resolution image is captured at a different sample time during illumination from a different incidence angle. As illustrated by the bottom illustration, the system 300 uses an imaging method with convex relaxation that uses a convex lifted ptychographic (CLP) technique to transform the image set b into a high-resolution complex sample image ψ.

FIG. 4A is a schematic drawing of a side view of components of a Fourier ptychographic imaging system 400 with convex relaxation of a second configuration, according to embodiments. The system 400 is in a second configuration sometimes referred to as "FPM-B." The system 400 comprises coherent EM radiation source 410 providing uniform EM radiation source to a specimen 420. The system 400 further comprises diffractive optics 430 comprising a first lens 432, a spatial light modulator 434 with a display at a Fourier plane of the specimen, and a second lens 436. The system 400 further comprises a digital radiation intensity detector 440 for detecting intensity images $m_F(r')$. In this example, diversity is provided by shifting a pattern at the display of the spatial light modulator 434.

To collect low-resolution images using this Fourier ptychographic imaging system with convex relaxation 400, the low NA lens 230 receives illumination altered by the specimen and filters the illumination based on its low NA. The digital radiation intensity detector 240 receives the filtered illumination from the low NA lens 230 and samples a sequence of j low-resolution images at j sample times during illumination by the j illumination sources. Each low-resolution image is captured at a different sample time during illumination from a different incidence angle.

FIG. 4B is a schematic drawing of a front view of a display of the spatial light modulator 434 of FIG. 4A. FIG. 4A includes an x'-axis and a y'-axis at the display plane. The display 435 is a rectangular display with dimensions of width L and height H. The display 233 is shown at acquisition (sample) time, $t_1$, when an aperture 436(1) (shown in solid line) is generated on the display 233. The illustration also includes a neighboring aperture 436(2) (shown in dotted line) that is displayed at another sample time (e.g., $t_2$) in the sequence of sample times. The distance between neighboring apertures 436 (1) and 436(2) is distance, c, in the x'-direction. The illustration also includes a last aperture 436 (N) in the sequence of apertures displayed at the last sample time $t_N$ in the sequence of N sample times. The spatial light modulator 434 is configured to display an aperture on its display 435 at a plurality of N locations. In this illustrated example, the plurality of N aperture locations is in the form of a rectangular grid (i.e., equally-spaced). In FIG. 4A, the apertures 436 have a constant circular shape with a diameter l. In other embodiments, the apertures may have different sizes and/or shapes (e.g., rectangular). Control instructions for displaying the apertures may be provided by one or more processors of the system 400.

The locations of neighboring apertures have an overlapping area between neighboring apertures such as, for example, the overlapping area 437 between aperture 436(1) and aperture 436(2). When using the reconstruction method with convex relaxation, the overlapping area need only be about 50% or lower of the area of one of the neighboring apertures to converge to a single imaging solution. Conventional FPM reconstruction required a more extensive overlapping area in the range of 80 to 90% in order to converge to an accurate solution. Since more overlap is required, more images and iterations are needed to cover the same area in the conventional systems. Thus, conventional systems required more exposure time and more resources to reconstruct the high resolution image.

FIG. 5 is a schematic drawing of components of a standard ptychographic imaging system with convex relaxation 500, according to embodiments. The standard ptychographic imaging system with convex relaxation 500 comprises an image collection assembly comprising a coherent EM radiation source 510 providing EM radiation, diffractive optics in the form of a lens 532 having a focal length f, and a digital radiation intensity detector 540. A specimen 520 being imaged is also illustrated. As shown, the coherent EM radiation source 510 is located at a length l from the lens 532 and provides coherent EM radiation to the specimen 520 located at the back focal plane of the lens 532 at a focal length f away. The digital radiation intensity detector 540 is located at a distance d from the sample plane. As shown, the lens 532 has an aperture a(r') associated with its NA. In this example, diversity is provided by shifting the position x of the specimen 520 $\psi(r-x)$. To collect low-resolution images using the illustrated standard ptychographic imaging system with convex relaxation 500, the digital radiation intensity detector 540 receives the illumination altered by the shifted specimen and samples low-resolution diffraction patterns of the specimen 520 at different shifted locations.

FIG. 6 is a schematic drawing of components of a coded aperture diffraction imaging system with convex relaxation 600, according to embodiments. The system 600 comprises an image collection assembly comprising a coherent EM radiation source 610 providing coherent EM radiation to a specimen 620 being imaged by the system 600. The image collection assembly of the system 600 further comprises diffractive optics in the form of a coded mask 630 at a distance $d_1$ from the specimen plane and a digital radiation intensity detector 640 at a distance $d_2$ from the coded mask 630. In this example, diversity is provided by shifting the mask position. To collect low-resolution images using the illustrated coded aperture diffraction imaging system with convex relaxation 600, the digital radiation intensity detector 640 receives light through the shifted mask position and samples a low-resolution image of the specimen 620 at different shifted mask locations.

II. Ptychographic Imaging Methods with Convex Relaxation

Figure 7:
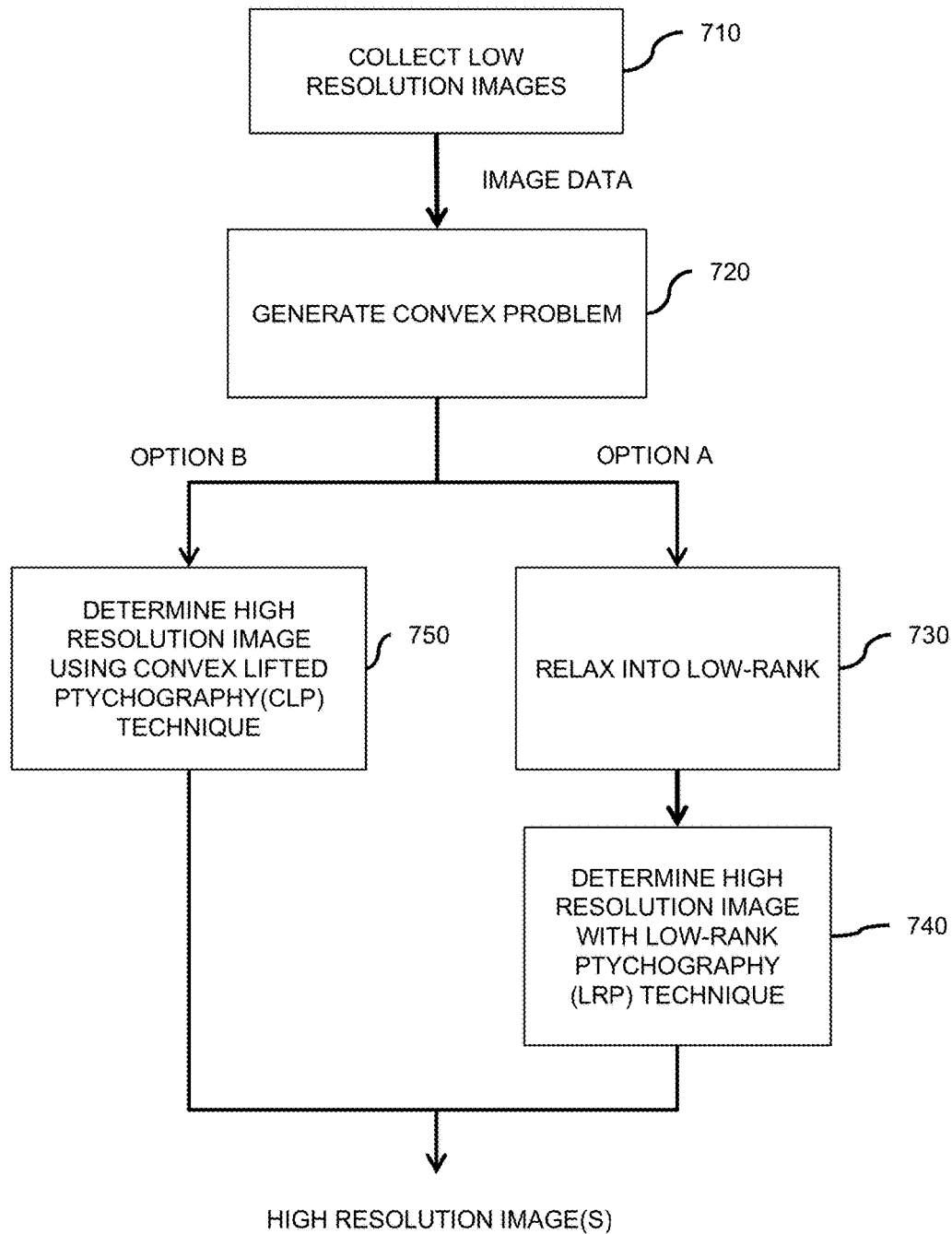
FIG. 7 is a flowchart of a ptychographic imaging method with convex relaxation, according to embodiments.

FIG. 7 is a flowchart of a ptychographic imaging method with convex relaxation, according to embodiments. At 710, the method starts by collecting a sequence of low-resolution images having diversity. Any of the image collection assemblies described with respect to FIGS. 2-6 can be used to sample this sequence of low-resolution images. At step 720, a convex combined image matrix is generated from the sequence of low-resolution images having diversity.

At this juncture in the method, there are two possible options (Option A) go to step 730 or (Option B) go to step 750. Generally speaking, if the convex combined image matrix contains large-scale ptychographic data (i.e. the low resolution images have a high number of pixels and/or the sequence has a high number of low resolution images), then Option A may be the more appropriate option. For example, Option A may be used if the number of pixels is more than 50×50 pixels for each low resolution image and/or the number of images is more than 200. If the convex combined image matrix has smaller scale data, Option B may be the appropriate option.

If Option A is used, the method relaxes the convex combined image matrix into low-rank formulation at step 730. Once in low-rank formulation, the method a minima of the new low-rank formulation to determine a high-resolution image. The method determines the minima based on a low-rank ptychographic (LRP) technique at step 740.

If Option B is used, the method determines a minima of X to determine a high-resolution image at step 750. In this case, the minima is determined using a convex lifted ptychographic (CLP) technique. An example of an appropriate convex solver can be found, for example, in the Templates for First-Order Conic Solvers (TFOCS) of CVS Research, Inc. and California Institute of Technology.

In the subsections that follow, certain steps described with reference to the flowchart in FIG. 7 are described in more detail using, for illustration purposes, the components of the Fourier ptychographic imaging system shown in FIGS. 2 and 3 as an example. It would be understood that the method described in FIG. 7 can also be used by other systems such as, for example, those shown in FIGS. 4-6. Moreover, while the method is described with respect to two-dimensional images for simplicity, an extension to three dimensions would be understood by those skilled in the art.

A. Collection of Low (Reduced) Resolution Images

This section describes example substeps of the collection of low resolution images step 710 of FIG. 7, according to certain embodiments. Although any of the systems described with respect to FIGS. 2-6 can be used to collect low-resolution images, the components of the Fourier ptychographic imaging systems described with respect to FIG. 2 or FIG. 3 are used in this section for illustration purposes. The substeps of the collection step 710 they can be used by the systems shown in FIGS. 4-6 are described in Section I with reference to those illustrated systems.

Figure 8:
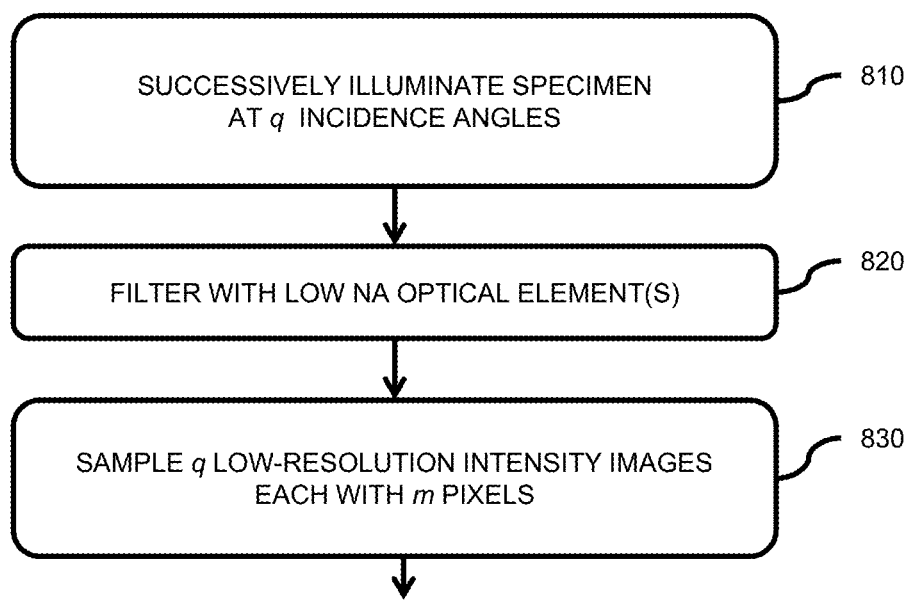
FIG. 8 is a flowchart of substeps of the low-resolution image collection step of FIG. 7, according to an embodiment.

FIG. 8 is a flowchart of substeps of the low-resolution image collection step 710 of FIG. 7, according to an embodiment. These substeps can be performed to collect low-resolution images using components of either of the Fourier ptychographic imaging systems described with respect to FIG. 2 or FIG. 3. At step 810, the specimen is successively illuminated at q incidence angles. The specimen can be successively illuminated by illuminating LEDs at q different locations of the LED array described with respect to FIG. 2 and FIG. 3. At step 820, the low NA lens of the diffractive optics receives illumination altered by the specimen and (low-pass) filters the illumination according to its aperture associated with its NA. At step 830, the digital radiation intensity detector receives light in the form of diffraction patterns and samples q lower (reduced) resolution images while the specimen is illuminated by LEDs at different locations from different incidence angles.

With respect to the Fourier ptychographic imaging systems in FIG. 2 or FIG. 3, it is assumed that there are q different quasi-monochromatic light sources (central wavelength λ) at a distant plane L(x') and that are evenly distributed along x' with a spacing of r. In other words, each light source is assumed to act as an effective point emitter illuminating the sample ψ(x) at a sample plane S(x) a large distance l away from L(x'). For example, the LED array 210 in FIG. 2 comprising evenly distributed LEDs is located a plane L(x'), which is a large distance away from the sample plane S(x) so that it can be assumed that each LED is an effective point emitter.

Based on this point emitter assumption, the $j^{th}$ light source (e.g., LED illuminated in FIG. 2 and FIG. 3) illuminates the sample with a spatially coherent plane wave at $\theta_j = \tan^{-1}(jr/l)$, where $-q/2 \leq j \leq q/2$. If the sample ψ(x) is thin, the optical field exiting the thin sample can be described as:

$$s(x,j) = \psi(x) e^{ikxp_j}$$ (Eqn. 1)

Where: wavenumber $k = 2\pi/\lambda$ and
$p_j = \sin \theta_j$ describes the off-axis angle of the $j^{th}$ light source
At each illumination by a $j^{th}$ light source, a $j^{th}$ illuminated sample field s(x,j) is collected by the collection optics having a low NA such as the low NA lens 230 of FIG. 2.

Neglecting scaling factors and a quadratic phase factor for simplicity, a Fourier optics setup gives the field at the imaging system pupil plane, A(x'), as $\mathcal{F}[s(x,j)] = \hat{\psi}(x'-p_j)$. Here, $\mathcal{F}$ represents the Fourier transform between conjugate variables x and x', where $\hat{\psi}$ is the Fourier transform of ψ, and the Fourier shift property has been applied. The shifted sample spectrum field $\hat{\psi}(x'-p_j)$ is then modulated by the imaging system's aperture function a(x'), which acts as a low-pass filter. In FIG. 2, the aperture function a(x') is provided by the shape of the aperture stop of the low NA of the lens 230.

The spectrum $\hat{\psi}$ is considered discretized into n pixels with a maximum spatial frequency k. The bandpass cutoff of the aperture function a is denoted as k·m/n, where m is an integer less than n. The modulation of $\hat{\psi}$ by a results in a field characterized by m discrete samples, which propagates to the imaging plane at g(x) and is sampled by an m-pixel digital radiation intensity detector 240. The m-pixel digital radiation intensity detector 240 samples intensity distribution related to reduced-resolution images that can be combined into a reduced resolution (low resolution) image matrix, g, as:

$$g(x,j) = |\mathcal{F}[a(x')\hat{\psi}(x'-p_j)]|^2$$ (Eqn. 2)

Where: g(x,j) is an (m×q) dimensional Fourier ptychographic data matrix.

That is, the $j^{th}$ column contains a low-resolution image of sample intensity while under illumination from the $j^{th}$ optical source.

In the imaging method with convex relaxation, a higher resolution (n-pixel) complex spectrum $\hat{\psi}(x')$ is reconstructed from the plurality of low-resolution (m-pixel) intensity measurements contained within the data matrix g. Once $\hat{\psi}$ is found, an inverse-Fourier transform yields the desired complex sample reconstruction, ψ.

Standard ptychographic systems resolve the inverse problem using alternating projections (AP) strategies: after initializing a complex sample estimate, $\psi_0$, iterative constraints help force $\psi_0$ to obey all known physical conditions. First, its amplitude is forced to obey the measured intensity measurement set from the detector plane (i.e., the values in g). Second, its spectrum $\hat{\psi}_0$ is forced to lie within a known support in the plane that is Fourier conjugate to the detector. While these AP strategies are known to converge when each constraint set is convex, the intensity constraint applied at the detector plane is not convex, which may sometimes lead to erroneous solutions and/or stagnation in finding a solution.

In one example, the components of the Fourier ptychographic system shown in FIGS. 2 and 3 can be rearranged into a standard ptychographic system by interchanging the sample plane S and the aperture plane A. This results in a standard ptychographic data matrix taking the form of Eqn. 2 but now with a sample spectrum described in real space as ψ, which is filtered by the Fourier transform of the aperture function, â. This corresponds to illuminating a thin sample ψ (centered at position p) with an illumination probe field, â. These two simple functional transformations lead to a linear relationship between standard and Fourier ptychographic data. To modify the method of convex relaxation discussed below for a standard ptychographic system, requires adherence to the following protocol wherever either variable appears: 1) replace the sample spectrum $\hat{\psi}$ with the sample function ψ, and 2) replace the aperture function a with the shape of the focused probe field that illuminates the sample, â in standard ptychographic system.

B. Generate Convex Combined Image Matrix

In this subsection, an embodiment of the step 720 of FIG. 7 is described in detail. The components of the Fourier ptychographic imaging system described with respect to FIG. 2 or FIG. 3 are used for simplicity to illustrate certain details of this step.

Figure 9:
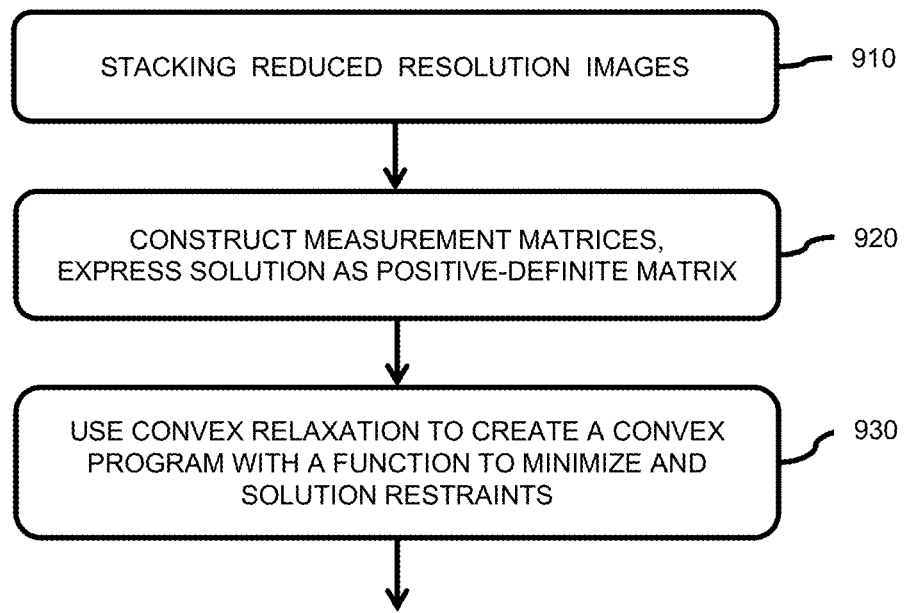
FIG. 9 is a flowchart of substeps of the generating a convex problem step of FIG. 7, according to an embodiment.

FIG. 9 is a flowchart of substeps of the generating a convex problem step 720 of FIG. 7, according to an embodiment. At step 910, the method stacks the collected sequence of q lower resolution images into a matrix. At step 920, the method constructs measurements matrices including the high resolution image solution matrix and expresses the solution as positive definite matrix. At step 930, the method uses convex relaxation to create a convex program with a function to minimize and the solution restraints.

To solve Eqn. 2 as a convex problem, it is expressed in matrix form. First, the unknown sample spectrum $\hat{\psi}$ is represented as an (n×1) vector where n is the known sample resolution before being reduced by the finite bandpass of the lens aperture. Next, the $j^{th}$ detected lower resolution image becomes an (m×1) vector $g_j$, where m is the number of pixels in each low-resolution image. The ratio n/m defines the ptychographic resolution improvement factor. It is equivalent to the largest angle of incidence from an off-axis optical source, divided by the acceptance angle of the imaging lens. Third, each lens aperture function a(x+$p_j$) is expressed as an (n×1) discrete aperture vector $a_j$, which modulates the unknown sample spectrum $\hat{\psi}$.

To rewrite Eqn. 2 as a matrix product $\{Aj\}_{j=1}^{q}$ is defined as a sequence of (m×n) rectangular matrices that contain a deterministic aperture function $a_j$ along a diagonal. For an aberration-free rectangular aperture, each matrix Aj has a diagonal of ones originating at (0, $p'_j$) and terminating at (m, $p'_j$+m−1), where $p'_j$ is now a discretized version of the shift variable, $p_j$. Finally, m×m discrete Fourier transform matrix $F^{(m)}$ is introduced to express the transformation of the low-pass filtered sample spectrum through the fixed imaging system for each low-resolution image $g_j$:

$$g_j = |F(m)A_j\hat{\psi}|^2, \ 1 < j < q \quad \text{(Eqn. 3)}$$

The ptychographic system collects a sequence of q lower resolution images, $\{g_j\}_{j=1}^{q}$ such as, for example, at step 710 of FIG. 7. The image set is combined into a single vector by "stacking" all the lower resolution images in Eqn. 3:

$$b = |FA\hat{\psi}|^2 = |D\hat{\psi}|^2 \quad \text{(Eqn. 4)}$$

This is an example of stacking in substep 910 of FIG. 9 (of step 720 of FIG. 7). In Eqn. 4, b is {g} expressed as a (q·m×1) stacked image vector. In addition, D=FA, where F is a (q·m×q·m) block diagonal matrix containing q copies of the low-resolution DFT matrices $F^{(m)}$ in its diagonal blocks, and A has size (q·m×n) and is formed by vertically stacking each aperture matrix $A_j$:

$$F = \begin{bmatrix} F^{(m)} & \cdots & 0 \\ \vdots & \ddots & \vdots \\ 0 & \cdots & F^{(m)} \end{bmatrix}, A = \begin{pmatrix} A_1 \\ \vdots \\ A_q \end{pmatrix} \quad \text{(Eqn. 5)}$$

The transpose of the $i^{th}$ row of the D matrix is denoted as $d_i$, which is a column vector. The set $\{d_i\}$ forms the measurement vectors. The measured intensity in the $i^{th}$ pixel is the square of the inner product between $d_i$ and the spectrum $\hat{\psi}$: $b_i = |\langle d_i, \hat{\psi} \rangle|^2$.

Figure 10:
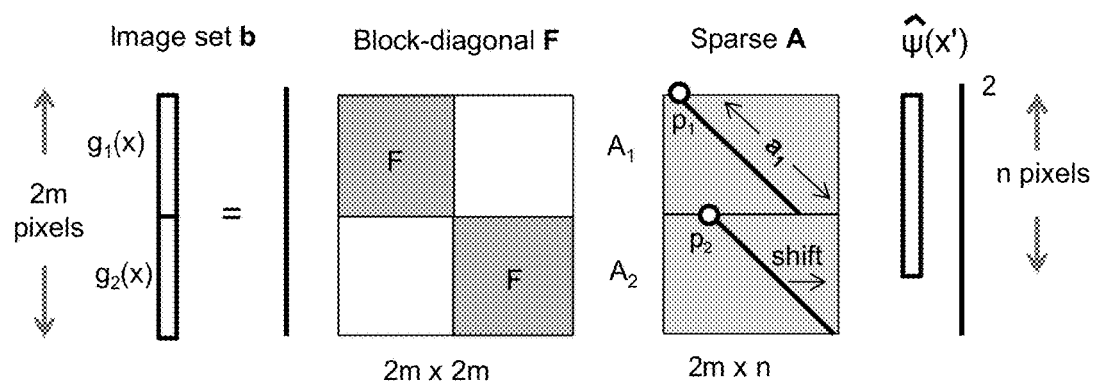
FIG. 10 is an illustration of a set of images captured by a Fourier ptychographic system and stacked together into a long data vector, according to an embodiment.

FIG. 10 is an illustration of a set of images captured by the Fourier typographic system and stacked together into a long data vector, b., according to an embodiment. Each associated matrix transform is similarly stacked and combined to form a final measurement matrix, D=FA. The illustrated example shows stacking of two images for simplicity. Typically, over 200 images are stacked. In other cases, over 100 images are stacked. In other cases, over 300 images are stacked.

The method "lifts" the solution $\hat{\psi}$ out of the quadratic relationship in Eqn. 4 and expresses the solution $\hat{\psi}$ in the space of (n×n) positive-semidefinite matrices:

$$b_i = Tr(\hat{\psi}^* d_i d_i^* \hat{\psi}) = Tr(d_i d_i^* \hat{\psi} \hat{\psi}^*) = Tr(D_i X) \quad \text{(Eqn. 6)}$$

where $D_i = d_i d_i^*$ is a rank-1 measurement matrix constructed from the $i^{th}$ measurement vector $d_i$, $X = \hat{\psi} \hat{\psi}^*$ is an (n×n) rank-1 outer product, and 1≤i≤q·m. This is an example of constructing measurement matrices at step 920 of FIG. 7. Eqn. 6 states that quadratic image measurements $\{b_i\}_{i=1}^{q \cdot m}$ are linear transforms of $\hat{\psi}$ in a higher dimensional space. These q·m linear transforms are combined into a single linear operator $\mathcal{A}$ to summarize the relationship between the stacked image vector b and the matrix X as, $\mathcal{A}(X) = b$.

The phase retrieval problem in ptychography can be posed as the following rank minimization process:

minimize rank(X)

subject to $\mathcal{A}(X) = b$,

X>0, where X>0 denotes that X is positive-semidefinite (Eqn. 7)

However, the minimization problem in Eqn. 7 is not convex. In order to transform the minimization program in Eqn. 7 into a convex problem, convex relaxation is performed on Eqn. 7 by replacing the rank of matrix X with its trace, which generates a convex semidefinite program as follows:

minimize Tr(X)

subject to $\mathcal{A}(X) = b$,

X>0, (Eqn. 8)

To account for the presence of noise, Eqn. 8 may be reformed such that the measured intensities in b are no longer strictly enforced constraints, but instead appear in the objective function as follows:

minimize $\alpha Tr(X) + \frac{1}{2}\|A(X) - b\|$ subject to X>0 (Eqn. 9)

Here, α is a scalar regularization variable that directly trades off goodness for complexity of fit. Its optimal value depends upon the assumed noise level. Eqn. 9 forms the final convex combined image matrix problem that can be used to recover a resolution improved complex sample $\psi$ from a set of obliquely illuminated images in b.

Both Eqn. 8 and Eqn. 9 use convex relaxation to generate a convex program with a function to minimize (minimization function) and solution constraints. In addition to generating a convex program, Eqn. 9 also accounts for noise. In certain aspects, the minimization function has no local minima.

If Option B is used in FIG. 7, the method determines the high resolution solution using a convex lifted ptychographic (CLP) technique. An example of an appropriate convex solver can be found, for example, in the Templates for First-Order Conic Solvers (TFOCS) of CVS Research, Inc. and California Institute of Technology. Some examples of results from using Option B are described in the following Section C. If Option A is used, then, the convex combined image matrix is relaxed into a low-rank formulation as described in subsection D below.

C. Results from Using Convex Lifted Ptychographic (CLP) Technique

In this Section, some simulated results of using Option B of FIG. 7 are provided. The components of the Fourier ptychographic imaging system described with respect to FIG. 2 or FIG. 3 are used for illustration purposes. In certain aspects, a CLP process can be used that supports a-priori knowledge of noise statistics to significantly increase the accuracy of image reconstruction in solving ptychography with a convex relaxation in the presence of noise.

In certain aspects, using a CLP process returns a low-rank matrix X, with a rapidly decaying spectrum, as the optimal solution of Eqn. 9. The trace term in the CLP objective function is primarily responsible for enforcing the low-rank structure of X. While this trace term also appears like an alternative method to minimize the unknown signal energy, a fair interpretation should consider its effect in a lifted (n×n) solution space. The final complex image estimate ψ can be obtained by first performing a singular value decomposition of X. Given low-noise imaging conditions and spatially coherent illumination, ψ is set to the Fourier transform of the largest resulting singular vector. Viewed as an autocorrelation matrix, useful statistical measurements may also be found within the remaining smaller singular vectors of X. One may also identify X as the discrete mutual intensity matrix of a partially coherent optical field: X=⟨ψ̂ψ̂*⟩, where ⟨ ⟩ denotes an ensemble average. Under this interpretation, Eqn. 9 becomes an alternative solver for the stationary mixed states of a ptychography setup.

Three points distinguish Eqn. 9 from conventional AP-based ptychography strategies. First, the convex CLP process has a larger search space. If AP strategies are used to iteratively update an n-pixel estimate, Eqn. 9 must solve for an n×n positive-semidefinite matrix. Second, this boost in the solution space dimension guarantees that the convex program may find a global optimum with tractable computation. This allows CLP technique to avoid AP's frequent convergence to local minima (i.e., failure to approach the true image). Unlike conventional solvers for the ptychography problem, no local minima exist in the CLP process of embodiments. Finally, Eqn. 9 considers the presence of noise by offering a parameter (a) to tune with an assumed noise level. AP-based solvers lack this parameter and can be easily led into incorrect local minima by even low noise levels as discussed in the following section.

CLP Technique Simulations and Noise Performance

In the example results described in this section, the Fourier ptychographic systems of FIG. 2 and FIG. 3 were simulated to use a CLP process to reconstruct a simulated high resolution image. The simulated Fourier ptychographic system contained a detector with $m=12^2$ pixels that were each 4 μm wide, a 0.1 numerical aperture (NA) lens at plane A(x', y') (6° collection angle, unity magnification), and an array of spatially coherent optical sources at plane L(x', y') (632 nm center wavelength, 10 nm spectral bandwidth). The LED array provided an illumination NA of 0.2 ($\theta_{max}$=11.5° maximum illumination angle). Together, the lens and illumination NAs define the reconstructed resolution of the complex sample as n=362 pixels, increasing the pixel count of one raw image by a factor n/m=9.

Figure 11:
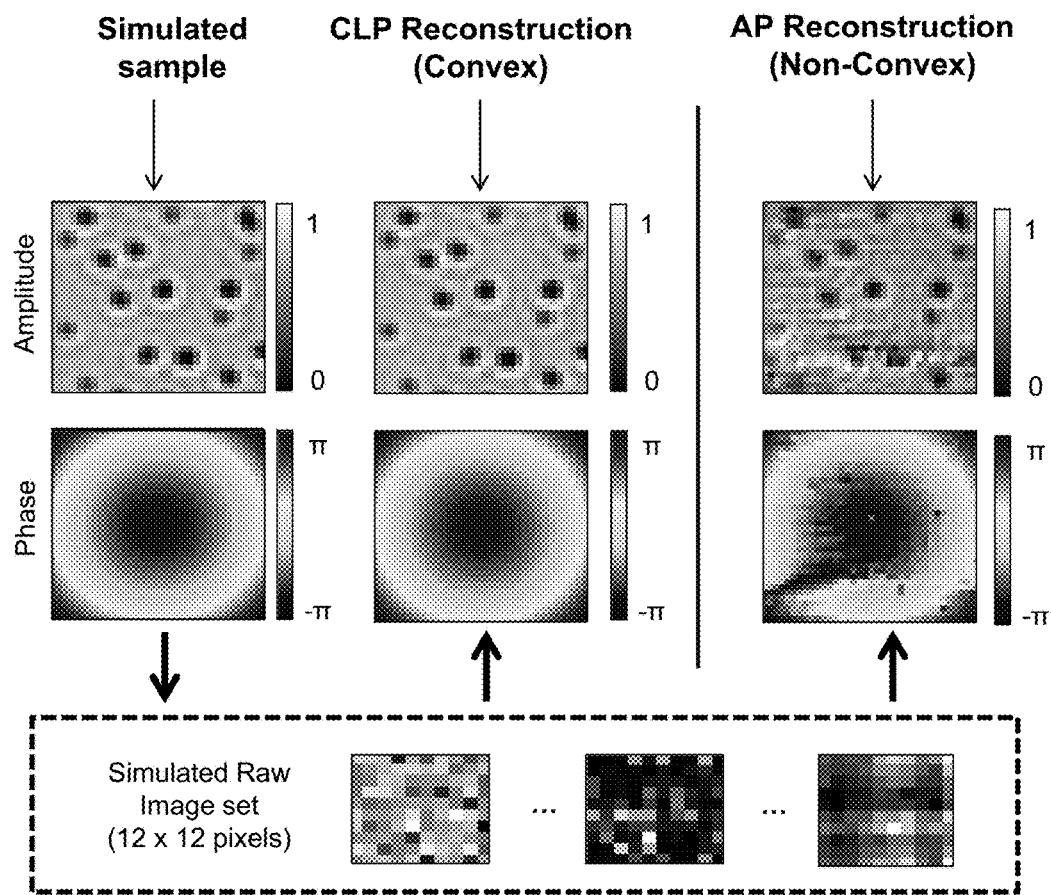
FIG. 11 are illustrations of a simulated high resolution image of a sample, simulated results from using a convex lifted ptychographic (CLP) technique to solve a convex program according to an embodiment, and simulated results from using an alternating projections (AP) reconstruction to solve a non-convex program for comparison.

FIG. 11 are illustrations of a simulated high resolution image of a sample, simulated results from using CLP reconstruction to solve a convex program according to an embodiment, and simulated results from using an AP reconstruction to solve a non-convex program for comparison. FIG. 11 also shows the simulated raw (low resolution) image collected, each image having 12×12 pixels. The images are of a specimen of absorptive microspheres modulated by a quadratic phase envelope. Within each raw image, the set of microspheres is not clearly resolvable. The sequence of low resolution simulated intensity measurements (m=12×12 pixels each) was collected. The capture of q=82 low resolution images was simulated with each uniquely illuminated from one of q=82 optical sources in the square array. These low resolution images were input into the image set of both a conventional AP algorithm (e.g., PIE strategy), as well as the CLP of Eqn. 9 to recover a high resolution (36×36 pixel) complex sample.

In the noiseless case, five (5) iterations of (Non-Convex) AP reconstruction introduced unpredictable artifacts to both the recovered amplitude and phase images as shown in FIG. 11. The AP reconstruction appears to have converged at an incorrect local minimum. The recovered amplitude and phase images using the CLP (Convex) reconstruction appear to have near perfect recovery. A constant phase offset is subtracted from both reconstructions. In this case, α=0.001.

The AP and CLP reconstructions were repeated again setting α=0.001 in Eqn. 9 while varying two relevant parameters: the number of captured images g, and their signal-to-noise ratio (SNR). In these reconstructions, SNR=10 $\log_{10}(\langle|\psi|^2\rangle/\langle|N^2|\rangle)$, where $\langle|\psi|^2\rangle$ is the mean sample intensity and <|N²|> is the mean intensity of uniform Gaussian noise added to each simulated raw image. To account for the unknown constant phase offset in all phase retrieval reconstructions, the reconstruction mean-squared error defined as MSE=$\Sigma_x|\psi(x)-\rho s(x)|^2/\Sigma_x|\psi(x)|^2$, where $\rho=\Sigma_x \psi(x)s^*(x)/\Sigma_x|s(x)|^2$ is a constant phase factor shifting the reconstructed phase to optimally match the known phase of the ground truth sample.

Figure 12:
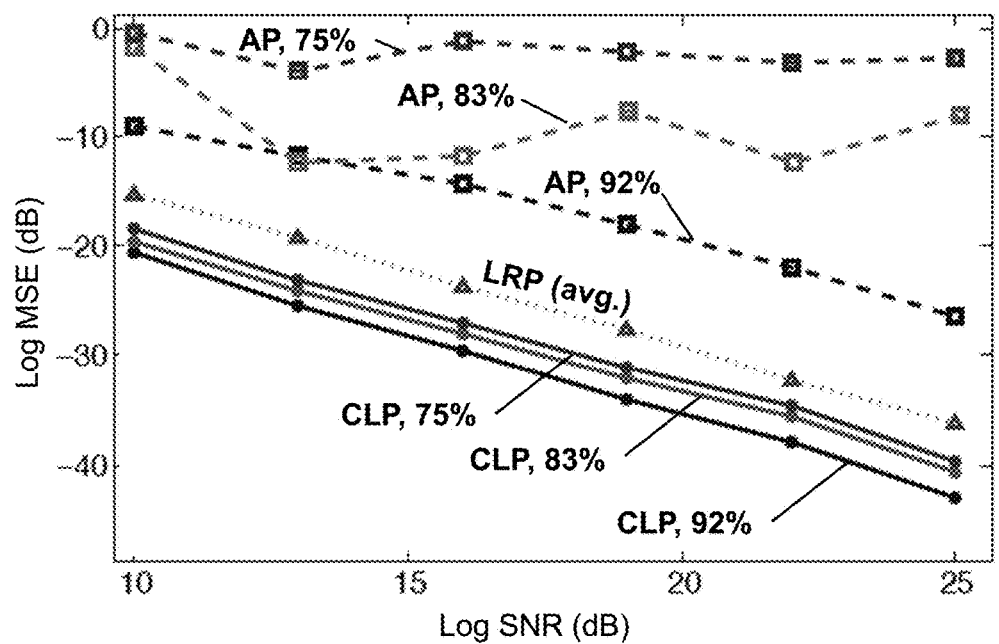
FIG. 12 are plots of the mean square error (MSE) as a function of signal noise ratio (SNR) for results using CLP and AP reconstructions, according to an embodiment.

FIG. 12 are plots of the MSE as a function of SNR for this large set of CLP and AP reconstructions, according to an embodiment. Each of the algorithms' 3 independent curves simulates reconstruction using a different number of captured images, q, corresponding to a different percentage of percentage of spectrum overlap. The Fourier spectrum overlap percentage is defined as: ol=1−(n−m)/qm. Each of the 6 points within one curve simulates a different level of additive measurement noise. Each point is an average over 5 independent runs with unique additive noise. Since AP reconstruction tends not to converge in the presence of noise, each AP trial is represented with the reconstruction that offers the lowest MSE across all iteration steps (up to 20 iterations). All CLP reconstructions improve linearly as SNR increases, while AP performance fluctuates unpredictably. For both reconstructions, performance improves with increased spectrum overlap ol, and reconstruction fidelity quickly deteriorates and then effectively fails when ol drops below ~60%.

When using the reconstruction method with convex relaxation of certain embodiments, each image spectrum need only overlap with each neighboring image spectrum by about 50% or lower to converge to a single imaging solution. Conventional FPM reconstruction methods require more extensive overlapping, e.g., 80-90%, to converge to an accurate solution. Since more overlap is required in conventional systems, more images and iterations are needed to cover the same Fourier space. Thus, conventional systems require more exposure time and more resources to reconstruct the high resolution image.

D. Factorization for Low-Rank Ptychography (LRP)

Within this subsection, certain details of steps 730 and 740 of FIG. 7, according to an embodiment, are discussed. The components of the Fourier ptychographic imaging system described with respect to FIG. 2 or FIG. 3 are used to illustrate these details. If Option A is used at step 720 of FIG. 7, the method in goes to step 730 to relax the convex program into a low-rank formulation.

Although generating a convex program based on Eqn. 9 makes reconstruction more efficient, the constraint that X remain positive-semidefinite can be computationally burdensome since each iteration may require a full eigenvalue decomposition of X. In order to process large-scale ptychographic data, certain aspects segment each detected image into tiles (e.g., $10^3$ pixel tile images), and process each tile (segment) separately, and then "tile" the resulting reconstructions back together into a final full resolution image. Tiling parallelization may increase efficiency for processing large-scale ptychographic data.

In certain embodiments, the method of convex relaxation provides another process for processing large-scale ptychographic data that may be used as an alternative or in conjunction with tiling parallelization. In these embodiments, the method may use Option A of FIG. 7, for example, which takes advantage of the fact that the desired solution of the ptychography problem in Eqn. 7 is low-rank. That is, in certain cases the method may relax the convex combined image matrix into a low-rank formulation at step 730.

In these cases, instead of solving for an n×n matrix X, the method can use a low-rank ansatz and factorize the matrix X as $X=RR^T$, where the decision variable R is now an n×r rectangular matrix containing complex entries, with r<n. Inserting this factorization into the optimization problem in Eqn. 8 and writing the constraints in terms of the measurement matrix $D_i=d_i d_i^T$ generates the non-convex program, Minimize $Tr(RR^T)$ subject to $Tr(D_i RR^T)=b_i$ for all $i$. (Eqn. 10)

Besides removing the positive semidefinite constraint in Eqn. 8, the factored form of Eqn. 10 presents two more key adjustments to the original convex formulation. First, using the relationship $Tr(RR^T)=\|R\|_F^2$, where F denotes a Frobenius norm, it is direct to rewrite the objective function and each constraint in Eqn. 10 with just one n×r decision matrix, R. Now instead of storing an n×n matrix like CLP, LRP must only store an n×r matrix. Since most practical applications of ptychography require coherent optics, the desired solution rank r will typically be close to 1, thus significantly relaxing storage requirements (i.e., coherent light satisfies $X=\hat{\psi}\hat{\psi}^*$, so one would expect R as a column vector and RRT a rank-1 outer product). Fixing r at a small value, LRP memory usage now scales linearly instead of quadratically with the number of reconstructed pixels, n. Second, the feasible set of Eqn. 10 is no longer convex and thus, the solution strategy must be shifted away from a simple semidefinite program to use an LRP technique instead.

In one aspect, the method can use the non-convex program of minimizing $Tr(RR^T)+|R|\_1$ is used with the same constraints of Eqn. 10. This latter term is the L1 norm of the unknown sample spectrum matrix, R.

At step 740 of FIG. 7 of certain embodiments, the method determines a minima of the low-rank formulation from step 730 using an LRP technique to determine the low-rank matrix, R. The LRP technique is a modification of the Burer-Monteiro method.

In certain aspects, to solve Eqn. 10, the following augmented Lagrangian function is minimized:

$$L(R, y, \sigma) = \text{(Eqn. 11)}$$
$$Tr(RR^T)\Sigma_i y_i \cdot (tr(D_i RR^T) - b_i) + \frac{\sigma}{2}\Sigma_i(Tr(D_i RR^T) - b_i)^2$$

Where $R \in C^{n \times r}$ is the unknown decision variable and the two variables $y \in R^{q^m}$ and $\sigma \in R^+$ are parameters to guide the method to its final reconstruction. Each $b_i$ is the intensity measured by one image sensor pixel. The LRP technique iteratively minimizes the function L by sequentially updating R and the parameters Y and σ.

The first term in Eqn. 11 is the objective function from Eqn. 10, indirectly encouraging a low-rank factorized product. This tracks the original assumption of a rank-1 solution within a "lifted" solution space. The second term contains the known equality constraints in Eqn. 10 (i.e., the measured intensities), each assigned a weight $y_i$. The third term is a penalized fitting error that is abbreviated with label v. It is weighted by one penalty parameter σ, mimicking the role of a Lagrangian multiplier.

With an appropriate fixed selection of $y_i$'s and σ, the minimization of L(R, y, σ) with respect to R identifies the desired optimum of Eqn. 10. Specifically, if a local minimum of L is identified each iteration (which is nearly always the case in practice), then the minimization sequence accumulation point may be a guaranteed solution. As an unconstrained function, the minimum of L can be found quickly using a quasi-Newton approach.

In some aspects, the goal of a low-rank ptychography (LRP) process is to determine a suitable set of $(y_i, \sigma)$ to minimize Eqn. 11 with respect to R, which leads to the desired high resolution image solution. An iterative process is used to sequentially minimize L with respect to $R^k$ at iteration k, and then update a new parameter set $(y^{k+1}, \sigma^{k+1})$ at iteration k+1. The parameters $(y^{k+1}, \sigma^{k+1})$ are updated to ensure their associated term's contribution to the summation forming L is relatively small. This suggests $R^{k+1}$ is proceeding to a more feasible solution. The relative permissible size of the second and third terms in L are controlled by two important parameters, η<1 and γ>1: if the third term v sufficiently decreases such that $v^{k+1} \leq \eta v^k$, then multiplier σ is held fixed and the equality constraint multipliers, $y_i$, is updated. Otherwise, σ is increased by a factor γ such that $\sigma^{k+1}=\gamma\sigma^k$.

In one example, the LRP process is initialized with an estimate of the unknown high-resolution complex sample function $\psi_0$, contained within a low-rank matrix $R^0$. The LRP process terminates if it reaches a sufficient number of iterations or if the minimizer fulfills some convergence criterion. $R^0$ is formed using a spectral method, which can help increase solver accuracy and decrease computation time. Specifically, the r columns of $R^0$ are selected as the leading r eigenvectors of D*diag[b]D, where D is the measurement matrix in Eqn. 4. While this spectral approach works quite well in practice, a random initialization of $R^0$ also often produces an accurate reconstruction.

In certain aspects, the LRP process uses two parameters, γ and η, which help guide its solution process. In most of the included experiments, the LRP process set γ=1.5. The most observable consequence of selecting a different value of γ is its influence on the number of iterations needed for a desired level of performance. A larger value for γ will cause a larger change within the augmented Lagrangian function each iteration, and thus a quicker progression to an optimized reconstruction.

In certain aspects, the LRP process sets η=0.5. A different value of η may also significantly alter the quality of reconstruction output with experimental input images (i.e., in the presence of noise).

Figure 13:
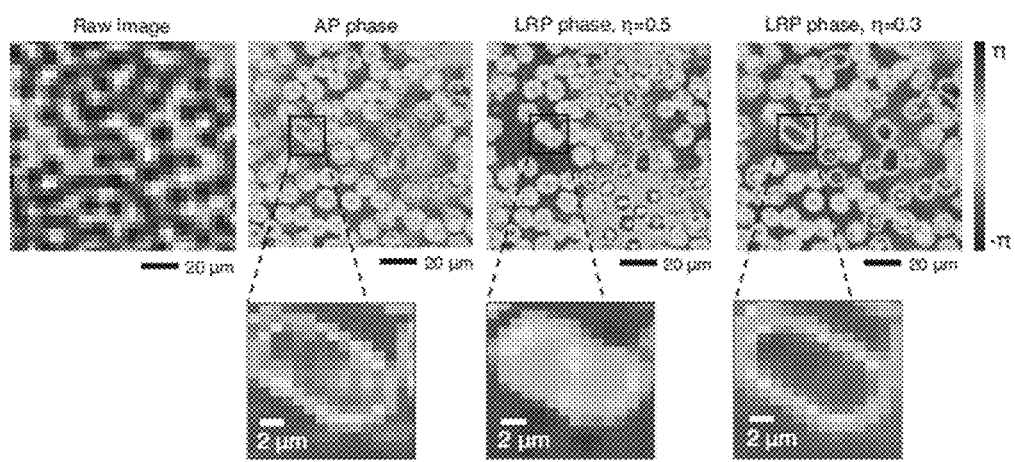
FIG. 13 is a raw image, a phase image reconstructed using an AP strategy, a phase image reconstructed using an LRP process where $\eta=0.5$, and a phase image reconstructed using an LRP process where $\eta=0.3$, according to embodiments.

FIG. 13 illustrates a raw image, a phase image reconstructed using an AP strategy, a phase image reconstructed using an LRP process where η=0.5, and a phase image reconstructed using an LRP process where η=0.3, according to an embodiment. The LRP process output exhibits a slightly non-uniform background when η=0.5, but is able to resolve two adjacent cells (unlike the App process result). Changing η to a smaller value (0.3) smooths out the LRP reconstruction to more closely resemble the AP reconstruction. The same experimental setup is used to create the images here that created the images in FIG. 16. 225 images are captured of a stained red blood cell slide with varied LED illumination.

FIG. 13 shows the resulting reconstructed phase determined using both AP (6 iterations) and LRP (15 iterations) processes. In this example $\gamma=1.5$ and $\eta=0.5$ was used in the LRP process. Note that the background of both the AP and LRP reconstructions is not very uniform. However, close examination reveals that two adjacent red blood cells are completely "smoothed" together by the AP algorithm, while LRP is able to resolve each cell boundary (see insets). It is noted that a smaller value of $\eta$ (e.g., setting $\eta=0.3$ and keeping all other algorithm parameters fixed) smooths out the LRP reconstructed phase such that it more closely resembles the smoother phase of AP-reconstructed cells. Unlike the AP result, the LRP background also remains uniform. In other words, $\eta$ appears to act as a global smoothing parameter, similar to the noise regularization variable $\lambda$ in the CLP program. AP strategies generally lack this type of parameter.

LRP Simulations and Noise Performance

Figure 14:
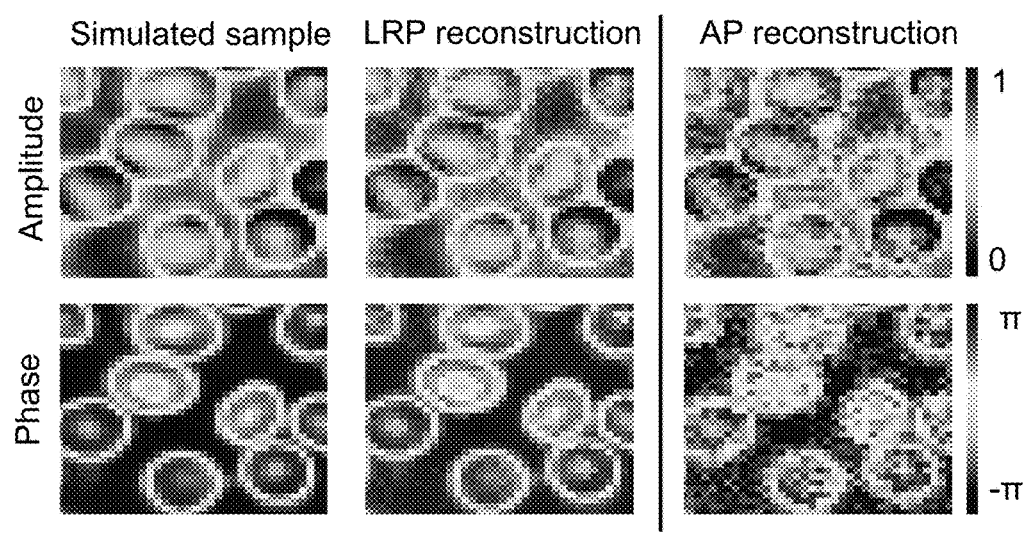
FIG. 14 are phase and amplitude images from simulated reconstruction results using the LRP process according to an embodiment versus using AP strategies for comparison.
Figure 15:
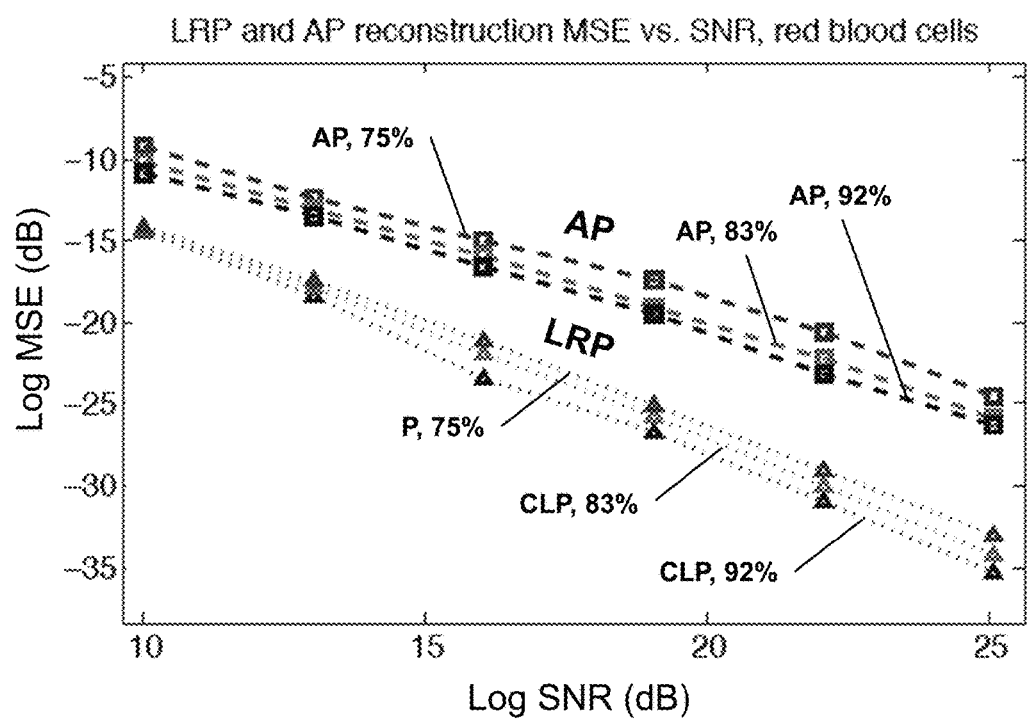
FIG. 15 is a plot of the MSE v. SNR from simulated results with red blood cells, according to an embodiment.

Following the same procedure used above to simulate the CLP process, MSE performance of the LRP process was tested as a function of SNR and the results are shown in FIGS. 14 and 15. FIG. 14 are phase and amplitude images from simulated reconstruction results using the LRP process versus using AP strategies for comparison, according to an embodiment. FIG. 15 is a plot of the MSE v. SNR from simulated results with red blood cells, according to an embodiment. Different amounts of uncorrelated Gaussian noise were added to each simulated raw image set and compare the LRP reconstruction was compared to a simulated sample image, which was experimentally obtained amplitude and phase of a human blood smear. It is qualitatively similar to the sample used in FIG. 11. Unlike with the simulations in FIGS. 11-12, the AP process no longer malfunctions at lower spectrum overlap percentages (i.e., lower values of ol). Despite this apparent success, the MSE of the LRP minimizer is still ~5-10 dB better than the MSE of the AP minimizer, across all levels of SNR. This reduced LRP reconstruction error follows without any parameter optimization or explicit noise modeling.

These simulations arbitrarily fix $\eta$ and $\gamma$ at 0.5 and 1.5, respectively, and set the desired rank of the solution, r, to 1. In some embodiments, these free variables may be changed which offers significant freedom to tune the response of LRP process to noise. For example, similar to the noise parameter $\alpha$ in Eqn. 9, the multiplier $\sigma$ (controlled via $\gamma$) in Eqn. 11 helps trade off complexity for goodness of fit by re-weighting the quadratic fitting error term.

In addition to reducing required memory, the LRP process also improves upon the computational cost of CLP process for large scale data. For an n-pixel sample reconstruction, the per iteration cost of the CLP algorithm is currently $O(n^3)$, using big-O notation. The positive-semidefinite constraint in Eqn. 9, which requires a full eigenvalue decomposition, defines this behavior limit. The per-iteration cost of the LRP algorithm, on the other hand, is $O(n \log n)$. This large per-iteration cost reduction is the primary source of LRP speedup.

Experimental Results

Experiments were used to verify that the LRP process of certain embodiments can improves the accuracy and noise stability of ptychographic reconstruction by using a Fourier ptychographic (FP) microscope with the configuration of the system in FIG. 2. Although demonstrated here at optical wavelengths, it is straightforward to acquire a Fourier ptychographic data set in an X-ray or electron microscope (e.g., with a tilting source). Alternatively, two trivial changes within Eqn. 10 directly prepare standard ptychographic data for LRP processing. This LRP process removes local minima and improves treatment of noise. First, it is quantitatively verified that the LRP process accurately measures high resolution and sample phase. Compared with AP reconstructions, the LRP process generates fewer undesirable artifacts in experiments. Second, the AP reconstructions and LRP reconstructions of a biological sample are compared, which establishes the improvement in noise stability of the LRP process.

Quantitative Performance

In these examples, the Fourier ptychographic microscope was comprised of a 15×15 array of surface-mounted LEDs (e.g., model SMD 3528, center wavelength $\lambda=632$ nm, 4 mm LED pitch, 150 µm active area diameter), which served as quasi-coherent optical sources. The LED array was placed l=80 mm beneath the sample plane, and each LED has an approximate 20 nm spectral bandwidth.

To quantitatively verify resolution improvement, each of the 15×15 LEDs was turned on beneath a U.S. Air Force (USAF) resolution calibration target. A microscope objective (e.g. 2× e.g., Olympus® objective with apochromatic Plan APO 0.08 NA) transferred each resulting optical field to a CCD detector (e.g., Kodak® KAI-29050 detector with 5.5 µm sized pixels), which sampled 225 low resolution images. Using this 0.08 NA microscope objective (5° collection angle) and a 0.35 illumination NA ($\theta_{max}=20°$ illumination angle), the Fourier ptychographic microscope provided a total complex field resolution gain of n/m=25. Each image spectrum overlapped by ol≈70% in area with each neighboring image spectrum. For reconstruction, n=25·m was selected and the same aperture parameters were used with both AP and LRP processes to create the high-resolution images shown in FIG. 16.

Figure 16:
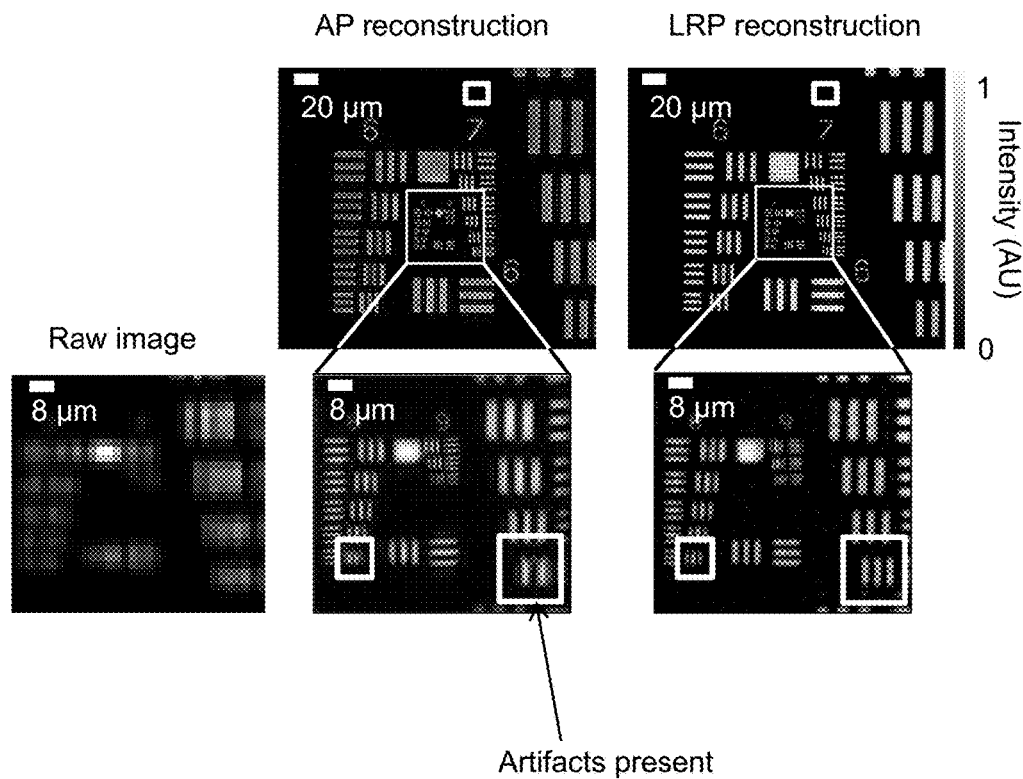
FIG. 16 are raw images, images resulting from AP reconstruction, and images resulting from LRP reconstruction, according to an embodiment.

FIG. 16 are illustrations of raw images, images resulting from AP reconstruction, and images resulting from LRP reconstruction, according to an embodiment. For computational efficiency, each low-resolution image was segmented into 3×3 tiles (n=4802 per tile) and the tiles were processed in parallel. The optimal number of AP and LRP process iterations with determined to be 6 and 15, respectively, and fixed at this for each tile (and all subsequent reconstructions). The LRP process was initialized with the following parameters: $\gamma=1.5$, $\eta=0.3$, $y^0=10$ and $\sigma^0=10$.

Both ~1 megapixel reconstructions achieved their maximum expected resolving power (i.e., resolved Group 9, Element 3: 1.56 µm line pair spacing). This is approximately 5 times sharper than the smallest resolved feature in one raw image (e.g., Group 7, Element 2). The LRP process avoids certain artifacts that are commonly observed during the nonlinear descent of AP process. Both reconstructions slowly fluctuate in background areas that are expected to be uniformly bright or dark. These fluctuations are caused in part by experimental noise, an imperfect aperture function estimate, and possible misalignments in the LED shift values, $p_j$. In a representative background area marked by a 402 pixel blue box in FIG. 6, AP and LRP exhibit normalized background amplitude variances of $\sigma_A^2=5.4\times10^{-4}$ and $\sigma_{AL}^2=5.0\times10^{-4}$, respectively. Accounting for experimental uncertainty in the aperture function a and shifts $p_j$ may reduce this error in both algorithms.

The LRP process was then demonstrated on a "high-NA" FP microscope configuration comprising a larger 0.5 NA microscope objective lens with a 30° collection angle (e.g., 20× Olympus 0.5 NA UPLFLN). For sample illumination, 28 LEDs are arranged into 3 concentric rings of 8, 8 and 12 evenly spaced light sources (ring radii=16, 32 and 40 mm, respectively). This new light source array was placed 40 mm beneath the sample to create a 0.7 illumination NA with a $\theta_{max}$=45° illumination angle. The synthesized numerical aperture of this FP microscope, computed as the sum of the illumination NA and objective lens NA, is NAs=1.2. With a greater-than-unity synthetic NA, reconstructions can offer oil-immersion quality resolution (~385 nm smallest resolvable feature spacing), without requiring any immersion medium between the sample and objective lens. A monolayer of polystyrene microspheres (index of refraction $n_m$=1.5 87) immersed in oil ($n_o$=1.515, both indexes for $\lambda$=632 nm light) was imaged by this high-NA" FP microscope configuration.

Figure 17:
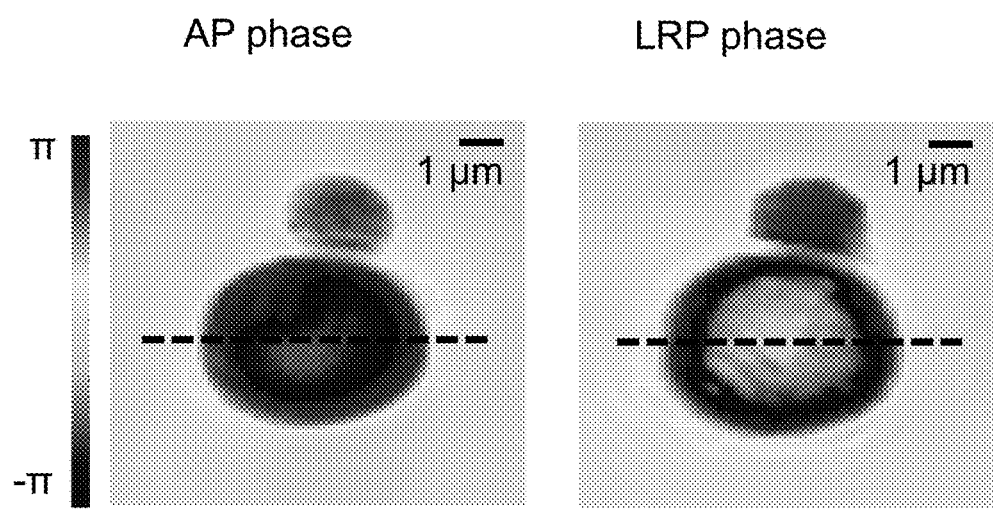
FIG. 17 are experimentally reconstructed phase maps emerging from two polystyrene microspheres using AP reconstruction and LRP reconstruction, according to an embodiment.
Figure 18:
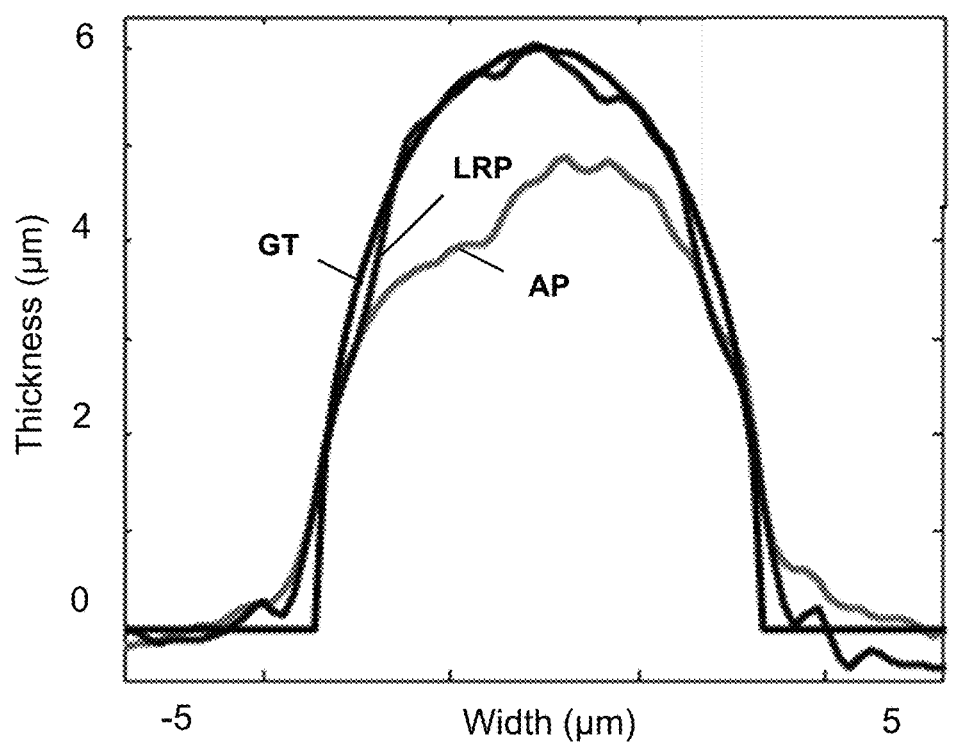
FIG. 18 is a plot of the phase values along each marked dashed line in FIG. 17 using AP reconstruction and LRP reconstruction according to an embodiment.

By using a LRP process of certain embodiments, the process was shown to reconstruct quantitatively accurate phase. Using the same data and parameters for AP and LRP input, the high-resolution phase reconstructions were obtained of two adjacent microspheres in FIG. 17 (3 μm and 6 μm diameters). For this reconstruction, m=1602 and n=3202. FIG. 17 are experimentally reconstructed phase maps emerging from two polystyrene microspheres using AP reconstruction and LRP reconstruction, according to an embodiment. A constant phase offset was subtracted from the LRP phase solution in the right image to allow for direct comparison to the AP solution in the left image. The two reconstructions appear qualitatively similar except at the center of the 6 μm sphere, where the AP phase profile unexpectedly flattens. This flattening is highlighted by selecting phase values along each marked dashed line in FIG. 17 to plot the resulting sample thickness profile in FIG. 18. FIG. 18 is a plot of the phase values along each marked dashed line in FIG. 17 using AP reconstruction and LRP reconstruction, according to an embodiment. The thickness profile in FIG. 18 demonstrates close agreement between the reconstruction using the LRP process and the ground truth (GT). Phase ϕ and sample thickness t are related via t=kΔϕ $(n_m-n_o)^{-1}$, where k is the average wavenumber and Δϕ=ϕ−ϕ₀ is the reconstructed phase minus a constant offset. The LRP results closely matches the optical thickness of a ground-truth sphere (GT, black curve): the length of the vertical chord connecting the top and bottom arcs of a 6 μm diameter circle. The normalized amplitude variances from a 402-pixel background area are $\sigma_A^2$=9.2×10$^{-4}$ and $\sigma_L^2$=5.8× 10$^{-4}$, respectively. In these aspects, the high resolution reconstructions formed by LRP process are more accurate than those formed by AP strategies.

Biological Sample Reconstruction

The third imaging example uses the same high-NA FP configuration (i.e. collection angle=30°, $\theta_{max}$=45°) of the embodiments discussed with respect to FIG. 17 to resolve a biological phenomenon: the infectious spread of malaria in human blood. The early stages of a *Plasmodium falciparum* infection in erythrocytes (i.e., red blood cells) include the formation of small parasitic "rings." It is challenging to resolve these parasites under a microscope without using an immersion medium, even after appropriate staining Oil-immersion is required for an accurate diagnosis of infection. The ptychographic microscope is used to resolve *Plasmodium falciparum*-infected cells with a 0.5 NA objective lens and using no oil.

Figure 19:
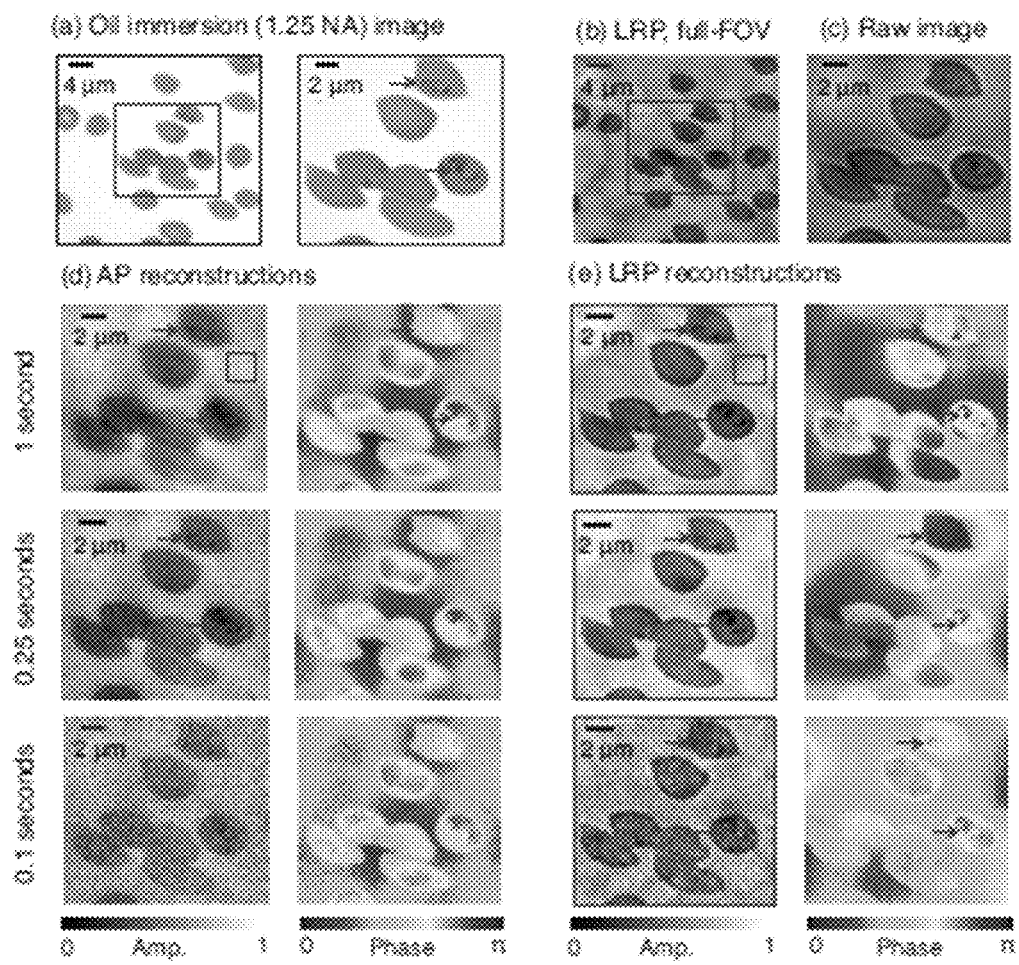
FIG. 19 are six reconstructed images obtained using an LRP process, two full FOV images obtained with an LRP process, six reconstructed images obtained using an AP process, and two images obtained with a conventional high-NA oil-immersion microscope (NA=1.25) under Kohler illumination, according to an embodiment.

FIG. 19 includes six reconstructed images obtained using an LRP process (bottom left group of six), two full FOV images obtained with an LRP process (top right), six reconstructed images obtained using an AP process (bottom right group of six), and two images obtained with a conventional high-NA oil-immersion microscope (NA=1.25) under Kohler illumination (top left), according to an embodiment.

The infected blood sample was prepared to maintain erythrocyte asexual stage cultures of the *P. falciparum* strain 3D7 in culture medium, then smeared, fixed with methanol, and then a Hema 3 stain was applied. An example sample region containing two infected cells, imaged with a conventional high-NA oil-immersion microscope (NA=1.25) under Kohler illumination. Twenty eight (28) uniquely illuminated images were captured of these two infected cells using the high-NA FP microscope. The top two right images contain an example normally illuminated raw image, which does not clearly resolve the parasite infection. Bottom left six images presents phase retrieval reconstructions using the standard AP algorithm, where m=1202, n=2402, run 6 iterations, and again subtract a constant phase offset. Reconstructions from three data sets were included: images captured with a 1 second exposure (top), a 0.25 second exposure (middle), and 0.1 second exposure (bottom). A shorter exposure time implies increased noise within each raw image. While the 1 sec exposure-based AP reconstruction resolves each parasite, blurred cell boundaries and non-uniform fluctuations in amplitude suggest an inaccurate AP convergence. However, both parasite infections remain visible within the reconstructed phase. The parasites become challenging to resolve within the phase from 0.25 sec exposure data, and are not resolved within the phase from the 0.1 sec exposure data, due to increased image noise. The normalized background variance of each AP amplitude reconstruction, from a representative 402-pixel window (marked blue square), is σ2=0.0020, 0.0027, and 0.0059 for the 1 sec, 0.25 sec, and 0.1 sec exposure reconstructions, respectively.

For comparison, reconstructions using the LRP process are shown (sharpest solutions after 15 iterations). For each reconstructed amplitude, the desired solution rank is set to r=3. The 3 modes of the resulting reconstruction are added in an intensity basis to create the displayed amplitude images. For each reconstructed phase, the desired solution matrix rank is set to r=1 and all other parameters are left unchanged. For all three exposure levels, the amplitude of the cell boundaries remains sharper than in the AP images. Both parasite infections are resolvable in either the reconstructed amplitude or phase, or both, for all three exposure levels. The normalized amplitude variances from the same background window are now σ2=0.0016 (1 sec), 0.0022 (0.25 sec), and 0.0035 (0.1 sec), an average reduction (i.e., improvement) of 26% with respect to the AP results. The AP reconstructions here offer a generally flatter background phase profile than LRP (i.e., less variation at low spatial frequencies). Without additional filtering or post-processing, the AP algorithm here might offer superior quantitative analysis during e.g. tomographic cell reconstruction, where low-order phase variations must remain accurate. However, it is clear within FIG. 8 that LRP better resolves the fine structure of each infection, which is critical during malaria diagnosis. A shorter image exposure time (i.e., up to 10 times shorter) may still enable accurate infection diagnosis when using LRP, as opposed to the standard AP approach.

Through the relaxation in Eqn. 8, the traditionally nonlinear phase retrieval process for ptychography is transformed into a convex program. The convex program can be solved with a CLP process if it is a small-scale image set. If it is a large-scale image set, the convex program can be relaxed into low rank formulation resulting semidefinite program with an appropriate factorization, and then solved with a LRP process. This method of convex relaxation provides a process that is robust to noise.

Besides removing local minima from the recovery process, perhaps the most significant departure from conventional phase retrieval solvers is a tunable solution rank, r. As noted earlier, r connects to statistical features of the ptychographic experiment, typically arising from the partial coherence of the illuminating field. Coherence effects are significant at third-generation X-ray synchrotron sources and within electron microscopes. An appropriately selected r may eventually help LRP process measure the partial coherence of such sources. The solution rank may also help identify setup vibrations, sample auto-fluorescence, or even 3D sample structure. In some cases, the method of convex relaxation can artificially enlarge the solution rank to encourage the transfer of experimental noise into its smaller singular vectors. Other extensions of LRP include simultaneously solving for unknown aberrations (i.e., the shape of the probe in standard ptychography), systematic setup errors, and/or inserting additional sample priors such as sparsity.

III. Subsystems

Figure 20:
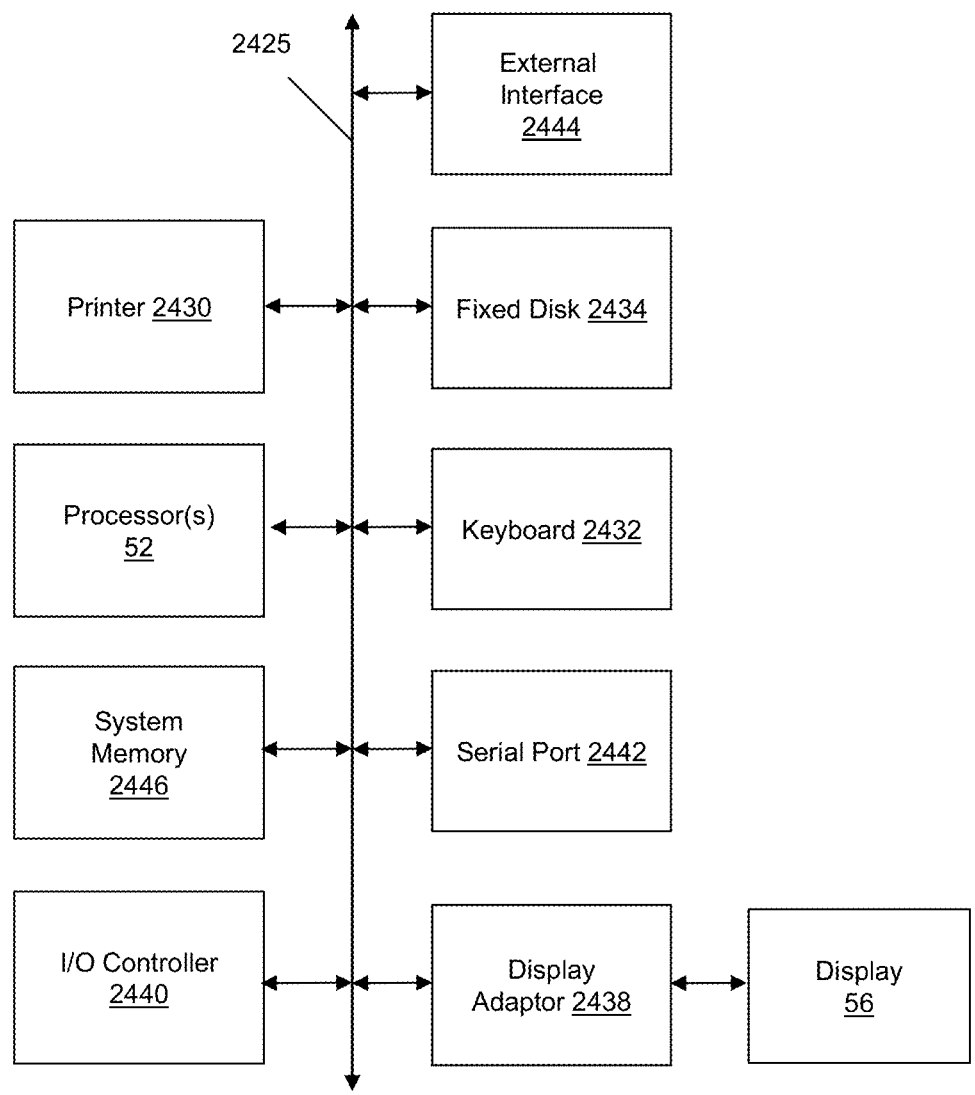
FIG. 20 is a block diagram of one or more subsystems that may be present in certain ptychographic systems with convex relaxation, according to embodiments.

FIG. 20 is a block diagram of one or more subsystems that may be present in certain ptychographic systems with convex relaxation, according to embodiments. A processor may be a component of the digital radiation intensity detector in some cases.

The various components previously described in the Figures may operate using one or more of the subsystems to facilitate the functions described herein. Any of the components in the Figures may use any suitable number of subsystems to facilitate the functions described herein. Examples of such subsystems and/or components are shown in a FIG. 20. The subsystems shown in FIG. 20 are interconnected via a system bus 2425. Additional subsystems such as a printer 2430, keyboard 2432, fixed disk 2434 (or other memory comprising computer readable media), display 56, which is coupled to display adapter 2438, and others are shown. Peripherals and input/output (I/O) devices, which couple to I/O controller 2440, can be connected by any number of means known in the art, such as serial port 2442. For example, serial port 2442 or external interface 2444 can be used to connect components of a computing device to a wide area network such as the Internet, a mouse input device, or a scanner. The interconnection via system bus 2425 allows the processor to communicate with each subsystem and to control the execution of instructions from system memory 2446 or the fixed disk 2434, as well as the exchange of information between subsystems. The system memory 2446 and/or the fixed disk 2434 may embody the CRM 54 in some cases. Any of these elements may be present in the previously described features.

In some embodiments, an output device such as the printer 2430 or display 56 of the Fourier camera system can output various forms of data. For example, the Fourier camera system can output 2D color/monochromatic images (intensity and/or phase), data associated with these images, or other data associated with analyses performed by the Fourier camera system.

Modifications, additions, or omissions may be made to any of the above-described embodiments without departing from the scope of the disclosure. Any of the embodiments described above may include more, fewer, or other features without departing from the scope of the disclosure. Additionally, the steps of the described features may be performed in any suitable order without departing from the scope of the disclosure.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a CRM, such as a random access memory (RAM), a read only memory (ROM), a magnetic medium such as a hard-drive or a floppy disk, or an optical medium such as a CD-ROM. Any such CRM may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A ptychographic imaging system with convex relaxation, the system comprising:
   an LED array configured to provide coherent radiation to illuminate a specimen being imaged, the LED array configured to activate different individual LEDs of the LED array to sequentially illuminate the specimen from a plurality of incident angles;
   a lens configured to collect light issuing from the specimen;
   a digital radiation intensity detector configured to receive light propagated from the lens and to capture intensity distributions for a sequence of low resolution intensity images of the specimen from sequential activation of individual LEDs in the LED array, each low-resolution intensity image based on light issuing from the specimen while illuminated from one of the incidence angles; and
   a processor in communication with the digital radiation detector to receive the intensity distributions of the sequence of low resolution images, the processor configured to:
   generate a convex problem based on the sequence of low resolution images; and
   optimize the convex problem to reconstruct a high-resolution image of the specimen, wherein reconstructing the high-resolution image comprises recovering phase data from the sequence of the low-resolution intensity images.

2. The ptychographic imaging system with convex relaxation of claim 1, wherein the LED array comprises concentric rings, each ring having spaced LEDs.

3. The ptychographic imaging system with convex relaxation of claim 1, wherein the LED array is a two-dimensional array of LEDs.

4. The ptychographic imaging system with convex relaxation of claim 1, wherein the processor generates the convex problem by:
   stacking image data from the low-resolution images into a combined image matrix;
   constructing measurement matrices; and
   generating the convex problem using convex relaxation.

5. The ptychographic imaging system with convex relaxation of claim 1, where the convex problem comprises a minimization function and solution restraints.

6. The ptychographic imaging system with convex relaxation of claim 5, wherein the minimization function has no local minima.

7. The ptychographic imaging system with convex relaxation of claim 1, wherein the lens is part of a low NA objective lens.

8. The ptychographic imaging system with convex relaxation of claim 1, wherein the processor optimizes the convex problem by:
   relaxing the convex problem into a low-rank formulation; and
   reconstructing the high-resolution image of the specimen using a low-rank ptychography process.

9. The ptychographic imaging system with convex relaxation of claim 1, wherein if the convex problem is large scale, then the processor optimizes the convex problem by:
   relaxing the convex problem into a low-rank formulation; and
   reconstructing the high-resolution image of the specimen using a low-rank ptychography process.

10. The ptychographic imaging system with convex relaxation of claim 1, wherein the convex problem is large scale if the number of low resolution images is above 200 or each low resolution image has a resolution of more than 50×50 pixels.

11. A ptychographic imaging method with convex relaxation, the method comprising:
   using an LED array to provide coherent radiation to a specimen from a plurality of incident angles sequentially by activating different individual LEDs of LED array in sequence;
   receiving, at a digital radiation intensity detector, light propagated from the specimen through a lens;
   sampling, using the digital radiation intensity detector, a sequence of low resolution images of the specimen, the sequence of lower resolution images associated with the plurality of incidence angles from sequential activation of individual LEDs in the LED array;
   generating a convex problem based on the sequence of low resolution images; and
   optimizing the convex problem to reconstruct a high-resolution image of the specimen, wherein reconstructing the high-resolution image comprises recovering phase data from the sequence of the low-resolution intensity images.

12. The ptychographic imaging method with convex relaxation of claim 11, wherein collecting the sequence of low resolution images of the specimen comprises:
   illuminating the specimen;
   providing a pattern at a plurality of locations on a display of a spatial light modulator located at the Fourier plane of the specimen;
   receiving, at a digital radiation intensity detector, light propagating light from the specimen using diffractive optics with the spatial light modulator; and
   sampling, using the digital radiation intensity detector, the sequence of low resolution images associated with the plurality of locations of the pattern.

13. The ptychographic imaging method with convex relaxation of claim 11, wherein generating the convex problem comprises:
   stacking image data from the low-resolution images into a combined image matrix;
   constructing measurement matrices; and
   generating the convex problem using convex relaxation.

14. The ptychographic imaging method with convex relaxation of claim 11, where the convex problem comprises a minimization function and solution restraints, wherein the minimization function has no local minima.

15. The ptychographic imaging method with convex relaxation of claim 11, wherein optimizing the convex problem comprises:
   relaxing the convex problem into a low-rank formulation; and
   reconstructing the high-resolution image of the specimen using a low-rank ptychography process.

16. The ptychographic imaging method with convex relaxation of claim 11, further comprising:
   if the convex problem is large scale, optimizing the convex problem by relaxing the convex problem into a low-rank formulation and reconstructing the high-resolution image of the specimen using a low-rank ptychography process.

17. The ptychographic imaging method with convex relaxation of claim 16, wherein the convex problem is large scale if the number of low resolution images is above 200 or each low resolution image has a resolution of more than 50×50 pixels.

18. A ptychographic imaging system with convex relaxation, the system comprising:
   one or more electromagnetic radiation sources configured to provide coherent radiation to illuminate a specimen being imaged during operation;
   a spatial light modulator configured to display a pattern in a Fourier plane of the specimen, wherein the pattern is displayed sequentially to a plurality of different locations in the Fourier plane;
   a digital radiation intensity detector configured to capture a sequence of low-resolution intensity images of the specimen based on light propagated by the spatial light modulator, each low-resolution image associated with light issuing from the specimen while the pattern is displayed at one of the plurality of different locations in the Fourier plane; and
   a processor in communication with the digital radiation detector to receive the sequence of low-resolution images, the processor configured to:
      generate a convex problem based on the sequence of low-resolution images; and
      optimize the convex problem to reconstruct a high-resolution image of the specimen, wherein reconstructing the high-resolution image comprises recovering phase data from the sequence of the low-resolution intensity images.

* * * * *